(12) United States Patent
McNeff et al.

(10) Patent No.: US 8,137,548 B2
(45) Date of Patent: *Mar. 20, 2012

(54) CHELATOR-MODIFIED INORGANIC OXIDE PARTICLES

(75) Inventors: Clayton McNeff, Anoka, MN (US); Bingwen Yan, Shoreview, MN (US); Dwight Stoll, Anoka, MN (US)

(73) Assignee: Zirchrom Separations, Inc., Anoka, MN (US)

(*) Notice: Subject to any disclaimer, the term of this patent is extended or adjusted under 35 U.S.C. 154(b) by 1361 days.

This patent is subject to a terminal disclaimer.

(21) Appl. No.: 10/965,273

(22) Filed: Oct. 14, 2004

(65) Prior Publication Data

US 2005/0118409 A1    Jun. 2, 2005

Related U.S. Application Data

(60) Provisional application No. 60/512,107, filed on Oct. 17, 2003.

(51) Int. Cl.
*B01D 15/08* (2006.01)

(52) U.S. Cl. .......... 210/198.2; 210/502.1; 210/635; 210/656; 502/402

(58) Field of Classification Search ............ 210/635, 210/656, 198.2, 502.1; 502/400, 401, 402
See application file for complete search history.

(56) References Cited

U.S. PATENT DOCUMENTS

| | | | | |
|---|---|---|---|---|
| 4,257,938 A * | 3/1981 | Hosoi et al. | ........ | 530/351 |
| 4,415,631 A * | 11/1983 | Schutijser | ........ | 428/405 |
| 4,469,875 A * | 9/1984 | Busker et al. | ........ | 548/532 |
| 4,599,175 A * | 7/1986 | Yamamizu et al. | ........ | 210/635 |
| 4,929,589 A * | 5/1990 | Martin et al. | ........ | 502/406 |
| 4,995,984 A * | 2/1991 | Barkatt | ........ | 210/670 |
| 5,045,190 A * | 9/1991 | Carbonell et al. | ........ | 210/198.2 |
| 5,051,176 A * | 9/1991 | Miyano et al. | ........ | 210/198.2 |
| 5,205,929 A * | 4/1993 | Carr et al. | ........ | 210/198.2 |
| 5,271,833 A * | 12/1993 | Funkenbusch et al. | ........ | 210/198.2 |
| 5,277,813 A * | 1/1994 | Feibush et al. | ........ | 210/502.1 |
| 5,346,619 A | 9/1994 | Funkenbusch et al. | | |
| 5,932,102 A * | 8/1999 | Wyllie et al. | ........ | 210/635 |
| 6,232,265 B1 * | 5/2001 | Bruening et al. | ........ | 502/401 |
| 6,319,868 B1 * | 11/2001 | Gani et al. | ........ | 501/80 |
| 6,572,766 B1 | 6/2003 | Bergström et al. | | |
| 6,802,966 B2 * | 10/2004 | Wormsbecher | ........ | 210/198.2 |
| 6,811,969 B1 * | 11/2004 | Hutchens et al. | ........ | 435/5 |
| 6,846,410 B2 * | 1/2005 | McNeff et al. | ........ | 210/198.2 |

OTHER PUBLICATIONS

T. Andersen, Quynh-Nhu T. Nguyen, R. Trones, T. Greibrokk, "Mesoporous Polybutadiene-Modified Zirconia for High-Temperature Packed Capillary Liquid Chromatography: Column Preparation and Temperature Programming Stability," Journal of Chromatography A, 1018, 7-18 (2003).

(Continued)

*Primary Examiner* — Ernest G Therkorn

(74) *Attorney, Agent, or Firm* — Pauly, DeVries Smith & Deffner, L.L.C.

(57) ABSTRACT

The present invention is directed to inorganic oxide particles that have been modified with a chelator group. In an embodiment, the chelator group is covalently bonded to a polymer. In an embodiment, the chelator group is covalently bonded to a chiral selector ligand. The present invention is also directed to methods of modifying inorganic oxide particles with a chelator group.

18 Claims, 12 Drawing Sheets

OTHER PUBLICATIONS

M.J. Annen, R. Kizhappali, P.W. Carr, and A. McCormick, "Development of Porous Zirconia Spheres by Polymerization-Induced Colloid Aggregation-Effect of Polymerization Rate," J. Mater. Sci. 29, 6123-30 (1994).

J.A. Blackwell and P.W. Carr, "A Chromatographic Study of the Lewis Acid-Base Chemistry of Zirconia Surfaces," J. Liq. Chromatogr. 14(15), 2875-89 (1991).

J.A. Blackwell and P.W. Carr, "Development of an Eluotropic Series for the Chromatography of Lewis Bases on Zirconium Oxide," Anal. Chem. 64, 863-73 (1992).

J.A. Blackwell and P.W. Carr, "Fluoride-Modified Zirconium Oxide as a Biocompatible Stationary Phase for High-Performance Liquid Chromatography," J. Chromatogr. 549, 59-75 (1991).

J.A. Blackwell and P.W. Carr, "Ion- and Ligand-Exchange Chromatography of Proteins Using Porous Zirconium Oxide Supports in Organic and Inorganic Lewis Base Eluents," J. Chromatogr. 596, 27-41 (1992).

J.A. Blackwell and P.W. Carr, "Ligand Exchange Chromatography of Free Amino Acids and Proteins on Porous Microparticulate Zirconium Oxide," J. Liq. Chromatogr. 15(9), 1487-1506 (1992).

J.A. Blackwell and P.W. Carr, "Ligand Exchange Chromatography of Free Amino Acids on Phosphated Zirconium Oxide Supports," J. Liq. Chromatogr. 15, 727-51 (1992).

J.A. Blackwell and P.W. Carr, "Role of Lewis Acid-Base Processes in Ligand-Exchange Chromatography of Benzoic Acid Derivatives on Zirconium Oxide," Anal. Chem. 64, 853-62(1992).

J.A. Blackwell and P.W. Carr "Study of the Fluoride Adsorption Characteristics of Porous Microparticulate Zirconium Oxide," J. Chromatogr. 549, 43-57 (1991).

P.W. Carr, J.A. Blackwell, T.P. Weber, W.A. Schafer, and M.P. Rigney, "Zirconium Oxide Based Supports for Biochromatographic Applications," in Chromatography in Biotechnology, C. Horvath and L.S. Ettre, (Eds.), ACS Symposium Series No. 529, 1993, pp. 146-164.

C.B. Castells, P.W. Carr, "A Study of Thermodynamics and Influence of Temperature of Chiral High-Performance Liquid Chromatographic Separations Using Cellulose tris(3,5-dimethylphenylcarbamate) Coated Zirconia Stationary Phases," Chromatograhphia, 52(9-10), 535-542 (2000).

Cecelia B. Castells and P.W. Carr, "Cellulose tris(3,5-dimethylphenylcarbamate) Coated Zirconia as a Chiral Stationary Phase for HPLC," Anal. Chem., 71, 3013-3021, 1999.

A.M. Clausen and P.W. Carr, "Chromatographic Characterization of Phosphonate Analog EDTA-Modified Zirconia Support for Biochromatographic Applications," Anal. Chem. 70, 378-85 (1998).

A.M. Clausen, A. Subramanian, and P.W. Carr, "Purification of Monoclonal Antibodies from Cell Culture Supernatants Using a Modified Zirconia Based Cation-Exchange Support," J. Chromatogr. A 831, 63-72 (1999).

C.J. Dunlap and P.W. Carr, "The Effect of Mobile Phase on Protein Retention and Recovery Using Carboxymethyl Dextran-Coated Zirconia Stationary Phases," J. Liq. Chrom. & Relat. Technol. 19, 2059-76 (1996).

C.J. Dunlap and P.W. Carr, "Synthesis and Chromatographic Characterization of Dextran-Coated Zirconia High Performance Liquid Chromatographic Stationary Phases," J. Chromatogr. A 746, 199-210 (1996).

C.J. Dunlap, P.W. Carr and A.V. McCormick, "A Chromatographic Comparison of the Pore Structures of Zirconia High Performance Liquid Chromatographic Materials Made by the Polymerization Induced Colloidal Aggregation and the Oil Emulsion Methods," Chromatographia, 42(5-6), 273-282 (1996).

Christopher J. Dunlap, Peter W. Carr, Clayton V. McNeff, Dwight Stoll, "Zirconia Stationary Phases for Extreme Separations," Anal. Chem., 598A-607A (2001).

Steven M. Fields, Christine Q. Ye, Dee Dee Zhang, B. Russell Branch, X. Jason Zhang, Ngozi Okafo, "Superheated Water as Eluent in High-temperature High-performance Liquid Chromatographic Separations of Steroids on a Polymer-coated Zirconia Column," Journal of Chromatography A, 913, 197-204 (2001).

M.H. Glavanovich and P.W. Carr, "Easily Regenerable Affinity Chromatographic Zirconia-Based Support with Concanavalin A as a Model Ligand," Anal. Chem. 66, 2584-9 (1994).

M. Gray, G.R. Dennis, P.J. Sloneckerb, R.A. Shalliker, "Separation of Oligostyrene Isomers in a Complex Mixture Using Two-Dimensional Heart-Cutting Reversed-Phased Chromatography," Journal of Chromatography A, 1028, 247-257 (2004).

M. Gray, G.R. Dennis, P. Wormell, R.A. Shalliker and P. Slonecker, "Two Dimensional Reversed-phase-reversed-phase Separations: Isomeric Separations Incorporating C18 and Carbon Clad Zirconia Stationary Phases," Journal of Chromatography A, 975, 285-297 (2002).

P. He, Yu Yang, "Studies on the Long-Term Thermal Stability of Stationary Phases in Subcritical Water Chromatography", Journal of Chromatography A, 989, 55-63 (2003).

R.A. Henry, "Highly Selective Zirconia-based Phases for HPLC Applications," American Laboratory, 34(22), 18-25 (2002).

Y. Hu and P.W. Carr, "The Special Effect of Fluoride on the Chromatography of Acidic Analytes on Polybutadiene-Coated Zirconia," Chromatographia, 56(7-8), 439-444 (2002).

Y. Hu and P.W. Carr, "Synthesis and Characterization of New Zirconia-Based Polymeric Cation-Exchange Stationary Phases for High-Performance Liquid Chromatography of Proteins," Anal. Chem. 70, 1934-42 (1998).

Y. Hu, X. Yang and P.W. Carr, "Mixed-mode Reversed-phase and Ion-exchange Separations of Cationic Analytes on Polybutadiene-coated Zirconia," Journal of Chromatography A, 968, 17-29 (2002).

R.P. Hunter, D.E. Koch, A. Mutlow, R. Isaza, "Extraction and Quantitation of Carfentanil and Naltrexone in Goat Plasma with Liquid Chromatography-Mass Spectrometry," Journal of Chromatography B, 793, 351-355 (2003).

P.T. Jackson and P.W. Carr, "Improving Reversed-Phase Liquid Chromatography," CHEMTECH 28, 29-37 (1998).

P.T. Jackson, T.-Y. Kim, and P.W. Carr, "Diastereomeric Selectivity of Carbon-Coated Zirconia Reversed-Phase Liquid Chromatographic Media," Anal. Chem. 69, 5011-17 (1997).

P.T. Jackson, M.R. Schure, T.P. Weber, and P.W. Carr, "Intermolecular Interactions Involved in Solute Retention on Carbon Media in Reversed-Phase High Performance Liquid Chromatography," Anal. Chem., 69, 416-425 (1997).

D.W. Karl, J.C. Magnusson, P.W. Carr, and M.C. Flickinger, "Preliminary Assessment of Removal of Pyrogenic Lipopolysaccharides with Colloidal Zirconia Adsorbents," Enzyme Microb. Technol. 13, 708-15 (1991).

T. Scott Kephart and Purnendu K. Dasgupta, "Hot Eluent Capillary Liquid Chromatography Using Zirconia and Titania Based Stationary Phases," Analytica Chimica Acta 414, 71-78 (2000).

T.S. Kephart, P.K. Dasgupta, "Superheated Water Eluent Capillary Liquid Chromatography," Talanta, 56, 977-987 (2002).

D.E. Koch, R. Isaza, J.W. Carpenter, R.P. Hunter, "Simultaneous Extraction and Quantitation of Fentanyl and Norfentanyl from Primate Plasma with LC/MS Detection," Journal of Pharmaceutical and Biomedical Analysis, 34, 577-584 (2004).

L.J. Lamm, Yu Yang, "Off-Line Coupling of Subcritical Water Extraction with Subcritical Water Chromatography via a Sorbent Trap and Thermal Desorption", Analytical Chemistry, 75, 2237-2242 (2003).

J.W. Li and P.W. Carr, "A Study of the Efficiency of Polybutadiene-Coated Zirconia as a Reversed-Phase Chromatographic Support," Anal. Chem., 69(11), 2193-2201, (1997).

J. Li and P.W. Carr, "Characterization of Polybutadiene-Coated Zirconia and Comparison to Conventional Bonded Phase by Use of Linear Solvation Energy Relationships," Analytica Chimica Acta, 334, 239-250 (1996).

J.W. Li and P.W. Carr, "Effect of Temperature on the Thermodynamic Properties, Kinetic Performance, and Stability of Polybutadiene-Coated Zirconia," Anal. Chem., 69(5), 837-843 (1997).

J.W. Li and P.W. Carr, "Evaluation of Temperature Effects on Selectivity in RPLC Separations Using Polybutadiene-Coated Zirconia," Anal. Chem., 69(11), 2202-2206 (1997).

J.W. Li and P.W. Carr, "The Retention Characteristics of Polybutadiene-Coated Zirconia and Comparison to Conventional Bonded Phases," Anal. Chem., 68(17), 2857-2868 (1996).

J.W. Li, Y. Hu, and P.W. Carr, "Fast Separations at Elevated Temperatures on Polybutadiene-Coated Zirconia Reversed-Phase Material," Anal. Chem. 69, 3884-8 (1997).

J.W. Li, D.H. Reeder, A.V. McCormick, and P.W. Carr, "Factors Influencing Polybutadiene Deposition within Porous Chromatographic Zirconia," J. Chromatogr. A 791, 45-52 (1998).

C. Francisco Lorrenzano-Porras, M.J. Annen, M.C. Flickinger, P.W. Carr and A.V. McCormick, "Pore Structure and Diffusion Tortuosity of Porous ZrO2 Synthesized by Two Different Colloid-Aggregation Processes," J. Colloid Interface Sci. 170, 299-307.

C. Francisco Lorrenzano-Porras, P.W. Carr and A.V. McCormick, "Relationship between Pore Structure and Diffusion Tortuosity of ZrO2 Colloidal Aggregates," J. Colloid Interface Sci. 164, 1-8 (1994).

C. Francisco Lorrenzano-Porras, D.H. Reeder, M.J. Annen, P.W. Carr and A.V. McCormick, "Unusual Sintering Behavior of Porous Chromatographic-Zirconia Produced by Polymerization-Induced Colloid Aggregation," Ind. Eng. Chem. Res. 34, 2719-27, (1995).

Y. Mao and P.W. Carr, "Adjusting Selectivity in Liquid Chromatography by Use of the Thermally Tuned Tandem Column Concept," Anal. Chem. 72, 110-118 (2000).

Y. Mao and P.W. Carr, "Application of the Thermally Tuned Tandem Column Concept to the Separation of Several Families of Environmental Toxicants," Anal. Chem., 72, 2788-2796, 2000.

Y. Mao and P.W. Carr, "Separation of Barbiturates and Phenylthiohydantoin Amino Acids Using the Thermally Tuned Tandem Column Concept," Anal. Chem., 73, 1821-1830, 2001.

Yun Mao and Peter W. Carr, "Separation of Selected Basic Pharmaceuticals by Reversed-Phase and Ion- Exchange Chromatography Using Thermally Tuned Tandem Columns," Anal. Chemistry; 73(18); 4478-4485 (2001).

Y. Mao and P.W. Carr, "The Thermally Tuned Tandem Column Approach to Optimizing Selectivity in HPLC," LCGC North America, 21(2), 150-167 (2003).

C. McNeff and P.W. Carr, "High-Performance Anion-Exchange Chromatography of Oligonucleotides and Oligodeoxynucleotides on Quaternized Polyethyleneimine-Coated Zirconia," Anal. Chem. 67, 2350-3 (1995).

C. McNeff and P.W. Carr, "Synthesis and Use of Quaternized Polyethyleneimine-Coated Zirconia for High-Performance Anion-Exchange Chromatography," Anal. Chem. 67, 3886-92 (1995).

C.V. McNeff, Q. Zhao, E. Almlof, M. Flickinger, P.W. Carr, "The Efficient Removal of Endotoxins from Insulin Using Quaternized Polyethyleneimine-Coated Porous Zirconia," Anal. Biochem., 274, 181-187, 1999.

C. McNeff, Q.H. Zhao, and P.W. Carr, "High-Performance Anion-Exchange of Small Anions with Polyethyleneimine Coated Porous Zirconia," J. Chromatogr. A 684, 201-11 (1994).

C. McNeff, L. Zigan, K. Johnson, P.W. Carr, A. Wang, A.M. Weber-Main, "Analytical Advantages of Highly Stable Stationary Phases for Reversed-Phase LC," LCGC, 18, 5, 514-529, 2000. (PDF version).

A. Mullick and M.C. Flickinger, "Expanded Bed Adsorption of Human Serum Albumin from Very Dense *Saccharomyces cerevesiae* Suspensions on Fluoride-Modified Zirconia," Biotechnology and Bioengineering, vol. 65, 282-290, (1999).

J. Nawrocki, P.W. Carr, M.J. Annen and S. Froelicher, "A TGA Investigation of Hydrated Monoclinic Zirconia," Analytica Chimica Acta, 327(3), 261-266 (1996).

J Nawrocki, C.J. Dunlap, P.W. Carr., and J.A. Blackwell, Review, "New Materials for Biotechnology: Chromatographic Stationary Phases Based on Zirconia," Biotechnol. Prog. 10, 561-73 (1994).

J. Nawrocki, C. Dunlap, J. Li, J. Zhao, C.V. McNeff, A. McCormick, P.W. Carr, "Part II. Chromatography Using Ultra-Stable Metal Oxide-Based Stationary Phases for HPLC," Journal of Chromatography A, 1028, 31-62 (2004).

J. Nawrocki, C. Dunlap, A. McCormick, P. W. Carr, "Part I. Chromatography Using Ultra-Stable Metal Oxide-Based Stationary Phases for HPLC," Journal of Chromatography A, 1028, 1-30 (2004).

J. Nawrocki, M.P. Rigney, A. McCormick, and P.W. Carr, Review, "Chemistry of Zirconia and Its Use in Chromatography," J. Chromatogr. A 657, 229-82 (1993).

Sung Yeh Park, Jung Kon Park, Jung Hag Park, Clayton V. McNeff, Peter W. Carr, "Separation of Racemic 2,4-dinitrophenyl amino acids on carboxymethyl-β-cyclodextrin Coated Zirconia in RPLC," Microc. J., 70, 179-185 (2001).

J.H. Park, J.K. Ryu, J.K. Park, C.V. McNeff, P.W. Carr, "Separation of Enantiomers on Bovine Serum Albumin Coated Zirconia in Reversed-Phase Liquid Chromatography," Chromatographia, 53(7-8), 405-408, (2001).

D.H. Reeder, A.M. Clausen, M.J. Annen, P.W. Carr, M.C. Flickinger, and A.V. McCormick, Note, "An Approach to Hierarchically-Structured Porous Zirconia Aggregates," J. Colloid Interface Sci. 184, 328-30 (1996).

D.H. Reeder, J.W. Li, P.W. Carr, M.C. Flickinger and A.V. McCormick, "Models for Polybutadiene Pore Wall Coatings in Porous Zirconia," J. Chromatogr., 760(1), 71-79 (1997).

M.P. Rigney, E.F. Funkenbusch, and P.W. Carr, "Physical and Chemical Characterization of Microporous Zirconia," J. Chromatogr. 499, 291-304 (1990).

M.P. Rigney, T.P. Weber, P.W. Carr, "Preparation and Evaluation of a Polymer-Coated Zirconia Reversed-Phase Chromatographic Support, "J. Chromatogr. 484, 273-91 (1989).

M.J. Robichaud, A.R. Sathyagal, P.W. Carr, A.V. McCormick, and M.C. Flickinger, Technical Note, "An Improved Oil Emulsion Synthesis Method for Large, Porous Zirconia Particles for Packed- or Fluidized-Bed Protein Chromatography," Sep. Sci. Technol. 32, 2547-59 (1997).

S. Sarkar, P.W. Carr, C.V. McNeff, A. Subramanian, "Characterization and Optimization of a Chromatographic Process Based on Ethylenedimine-N,N ,N',N' -tetra(methylphosphonic) acid-modified Zirconia Particles," Journal of Chromatography B, 790, 143-152 (2003).

W.A. Schafer, P.W. Carr, "Chromatographic Characterization of a Phosphate Modified Zirconia Support for Bio-chromatographic Applications," J. Chromatogr. 587, 149-60 (1991).

W.A. Schafer, P.W. Carr, E.F. Funkenbusch, and K.A. Parson, "Physical and Chemical Characterization of Porous Phosphate-Modified Zirconia Substrate," J. Chromatogr. 587, 137-47 (1991).

E. Schleyer, S. Pursche, C.H. Köhne, U. Schuler, U. Renner, H. Gschaidmeier, J. Freiberg-Richter, T. Leopold, A. Jenke, M. Bonin, T. Bergemann, P. le Coutre, M. Gruner, M. Bornhäuser, O.G. Ottmann, G. Ehninger, "Liquid Chromatographic Method for Detection and Quantitation of STI-571 and its Main Metabolite N-Desmethyl-STI in Plasma, Urine, Cerebrospinal Fluid, Culture Medium and Cell Preparations," Journal of Chromatography B, 799, 23-36 (2004).

A. Subramanian, P.W. Carr, C.V. McNeff, "Use of Spray-Dried Zirconia Microspheres in the Separation of Immunoglobulins from Cell Culture Supernatant," Journal of Chromatography, 890(1), 15-23, 2000.

Anuradha Subramanian and Sabyaschi Sarkar "Use of a Modified Zirconia Support in the Separation of Immunoproteins," Journal of Chromatography A, 944, 179-187 (2002).

L. Sun, M. Annen, C. Francisco Lorrenzano-Porras, P.W. Carr and A. McCormick, "Synthesis of Porous Zirconia Spheres for HPLC by Polymerization-Induced Aggregation (PICA)," J. Colloid Interface Sci. 163, 464-73 (1994).

L. Sun and P.W. Carr, "Chromatography of Proteins Using Polybutadiene-Coated Zirconia," Anal. Chem. 67, 3717-21, (1995).

L. Sun and P.W. Carr, "Mixed-Mode Retention of Peptides on Phosphate-Modified Polybutadiene-Coated Zirconia," Anal. Chem. 67, 2517-23 (1995).

L. Sun, A.V. McCormick, and P.W. Carr, "Study of the Irreversible Adsorption of Proteins on Polybutadiene Coated Zirconia," J. Chromatogr. A 658, 465-73 (1994).

Q. Tang, Y. Shen, N. Wu, M.L. Lee, "In Situ Crosslinked Polybutadiene-Encapsulated Zirconia as a Monolithic Column for Fast Solvating Gas Chromatography," J. Microcolumn Separations, 11(6), 415-420 (1999).

Jonathan D. Thompson and Peter W. Carr, "A Study of the Critical Criteria for Analyte Stability in High-Temperature Liquid Chromatography," Anal. Chem., 74, 1017-1023 (2002).

Brian C. Trammell, Marc A. Hillmyer, Peter W. Carr, "A Study of the Lewis Acid-Base Interactions of Vinylphosphonic Acid-Modified Polybutadiene-Coated Zirconia," Anal. Chem., 73, 14, 3323-3331 (2001).

E. Van Gyseghem, I. Crosiers, S. Gourvenec, D.L. Massart, Y. Vander Heyden, "Determining Orthogonal and Similar Chromatographic Systems from the Injection of Mixtures in Liquid Chromatography-Diode Array Detection and the Interpretation of Correlation Coefficients Color Maps," Journal of Chromatography A, 1026, 117-128 (2004).

T.P. Weber, P.W. Carr, "Comparison of Isomer Separation on Carbon-Clad Microporous Zirconia and on Conventional Reversed-Phase High-Performance Liquid Chromatography Supports," Anal. Chem. 62, 2620-5 (1990).

T.P. Weber, P.W. Carr., and E.F. Funkenbusch, "Evaluation of a Zirconia-Based Carbon-Polymer Composite Reversed-Phase Chromatographic Support," J. Chromatogr. 519, 31-52 (1990).

T.P. Weber, P.T. Jackson, and P.W. Carr, "Chromatographic Evaluation of Porous Carbon-Clad Zirconia Microparticles," Anal. Chem. 67, 3042-50 (1995).

N. Wu, Q. Tang, J.A. Lippert, M.L. Lee, "Packed Capillary Column Solvating Gas Chromatography Using Neat Water Mobile Phase and Flame Ionization Detection," J. Microcolumn Separations, 13(2), 41-47 (2001).

N. Wu, Q. Tang, Y. Shen, M.L. Lee, "Polybutadiene-Coated Zirconia Packing Materials in Solvating Gas Chromatography Using Carbon Dioxide as Mobile Phase," Chromatographia, 49(7-8), 431-435 (1999).

Y. Xiang, B. Van, B. Yue, C.V. McNeff, P.W. Carr, M.L. Lee, "Elevated-temperature Ultrahigh-pressure Liquid Chromatography Using Very Small Polybutadiene-coated Nonporous Zirconia Particles," Journal of Chromatography A, 983, 83-89 (2003).

Y. Xiang, B. Yan, C.V. McNeff, P.W. Carr, M.L. Lee, "Synthesis of Micron Diameter Polybutadiene-encapsulated Non-porous Zirconia Particles for Ultrahigh Pressure Liquid Chromatography," Journal of Chromatography A, 1002, 71-78 (2003).

B. Yan, C.V. McNeff, F. Chen, P.W. Carr, A.V. McCormick, "Control of Synthesis Conditions to Improve Zirconia Microspheres for Ultrafast Chromatography," J. Am. Ceram. Soc., 84, 8, 1721-1727 (2001).

B. Yan, J. Zhao, J.S. Brown, J. Blackwell and P.W. Carr, "High-Temperature Ultrafast Liquid Chromatography," Anal. Chem. 72, 1253-1262 (2000).

X. Yang, J. Dai, P.W. Carr, "Analysis and Critical Comparison of the Reversed-phase and Ion-exchange contributions to Retention on Polybutadiene Coated Zirconia and Octadecyl Silane Bonded Silica Phases," Journal of Chromatography A, 996, 13-31 (2003).

Akio Yuchi, Yasuharu Mizuno, Tomonori Yonemoto, "Ligand-Exchange Chromatography at Zirconium(IV) Immobilized on IDA-Type Chelating Polymer Gel," Anal. Chem., 72, 15, 3642-3646 (2000).

J. Zhao and P.W. Carr, "A Comparative Study of the Chromatographic Selectivity of Polystyrene-Coated Zirconia and Related Reversed-Phase Materials," Anal. Chem. 72, 302-309 (2000).

J. Zhao and P.W. Carr, "An Approach to the Concept of Resolution Optimization through Changes in the Effective Chromatographic Selectivity," Anal. Chem. 71, 2623-2632 (1999).

J. Zhao and P.W. Carr, "Comparison of the Retention Characteristics of Aromatic and Aliphatic Reversed Phases for HPLC Using Linear Solvation Energy Relationships," Anal. Chem. 70, 3619-28 (1998).

J. Zhao, P.W. Carr, "Quaternized Trimethylaminated Polystyrene-Coated Zirconia as a Strong Anion Exchange Material for HPLC," Anal. Chem. 72, 4413-4419 (2000).

J. Zhao and P.W. Carr, "Synthesis and Evaluation of an Aromatic Polymer-Coated Zirconia for Reversed-Phase Liquid Chromatography," Anal. Chem. 71, 5217-5224 (1999).

C.B. Castells, P.W. Carr, "Fast Enantioseparations of Basic Analytes by High-Performance Liquid Chromatography Using Cellulose Tris(3,5-dimethylphenylcarbamate)-Coated Zirconia Stationary Phases," Journal of Chromatography A, 904(1), 17-33 (2000).

J. Dai, X. Yang, P.W. Carr, "Comparison of the Chromatography of Octadecyl Silane Bonded Silica and Polybutadiene-Coated Zirconia Phases Based on a Diverse Set of Cationic Drugs," Journal of Chromatography A, 1005(1-2), 63-82 (2003).

M.J. Gray, G.R. Dennis, P.J. Slonecker, R.A. Shalliker, "Evaluation of the Two-Dimensional Reversed-Phase-Reversed-Phase Separations of Low-Molecular Mass Polystyrenes," Journal of Chromatography A, 1015(1-2), 89-98 (2003).

T.S. Kephart, P.K. Dasgupta, "Superheated Water Eluent Capillary Liquid Chromatography," Talanta, 56, 977-987 (2002).

B.A. Musial, A.J. Sommer, N.D. Danielson, "Microchannel Thin Layer Chromatography with in Situ Plate Scanning Micro-DRIFTS Detection Using Plain and Polybutadiene Modified Zirconia Stationary Phases," Applied Spectroscopy, 56(8), 1059-1066 (2002).

E. Van Gyseghem, S. Van Hemelryck, M. Daszykowski, F. Questier, D.L. Massart, Y. Vander Heyden, "Determining Orthogonal Chromatographic Systems Prior to the Development of Methods to Characterise Impurities in Drug Substances," Journal of Chromatography A, 988(1), 77-93 (2003).

D.A. Whitman, T.P. Weber, J.A. Blackwell, "Chemometric Characterization of Lewis-Base Modified Zirconia for Normal Phase Chromatography," Journal of Chromatography A, 691, 205-212 (1995).

D. Xiang, L. Tang and J.A. Blackwell, "Evaluation of the Stability and Selectivity for Various Adjustable Stationary Phases Using Zirconium Oxide Supports in High-Performance Liquid Chromatography," Journal of Chromatography A, 953(1-2), 67-77 (2002).

B. Van, C.V. McNeff, P.W. Carr, A.V. McCormick, "Synthesis and Characterization Submicron-to-Micron Scale, Monodisperse, Spherical, and Nonporous Zirconia Particles," J. Am. Ceram. Soc., 88(3), 707-713 (2005).

* cited by examiner

CHELATOR-MODIFIED INORGANIC OXIDE PARTICLES

This application claims priority of U.S. Patent Application No. 60/512107, filed Oct. 17, 2003, which application is incorporated herein by reference.

GOVERNMENT FUNDING

This invention was made with government support under Grant No. 5R44HL070334-03, awarded by the U.S. Department of Health and Human Services. The Government has certain rights in the invention.

FIELD OF THE INVENTION

The present invention relates to inorganic oxide particles useful as packing materials for chromatography. More particularly, the invention is directed to inorganic oxide particles that have been modified with a chelator.

BACKGROUND OF THE INVENTION

Many inorganic oxide particles are known in the art that are useful in sorbent applications, particularly as packing materials for High Performance Liquid Chromatography (HPLC).

The majority of separations employing high performance liquid chromatography are performed in the reversed-phase mode, wherein the column packing material surface is modified with a hydrophobic layer. In reversed-phase mode the column packing, or stationary phase, has is generally hydrophobic, while the mobile phase contains some fraction percent of water and therefore has more polarity. The most common presently used stationary phases employ a non-polar ligand (e.g., octane or octadecane) covalently bound to a porous silica ($SiO_2$) particle through a siloxane bond to render the silica surface hydrophobic. Although these silica-based supports are very useful for a wide range of applications in reversed-phase HPLC, their use is typically limited to a pH range of between 2 and 8, due to the hydrolytic instability of both the silica support particle and the siloxane bond used to "anchor" the non-polar active group.

The strictly limited pH range for silica particles led, in part, to the use of other materials such as zirconia ($ZrO_2$) as a substrate material for HPLC column packings. Particles made of zirconia have proven useful but have had other limitations. Some solutes, such as those that can act as a Lewis base, interact strongly with zirconia based particles and are not eluted with good peak shape or good efficiency. In extreme cases this interaction can result in irreversible adsorption of a solute on the chromatographic media. One approach to solving this problem has been the use of additives to the mobile phase capable of acting as a Lewis base, such as ammonium phosphate, sodium fluoride, sodium acetate or the like. However, this approach does not work with all applications (such as LC/MS which often requires volatile buffers) and still does not result in optimal chromatographic performance.

Therefore, a need exists for methods of modifying inorganic oxide particles so that Lewis base containing solutes can be eluted without the use of mobile phase additives and with enhanced chromatographic performance.

SUMMARY OF THE INVENTION

The present invention is directed to inorganic oxide particles that have been modified with a chelator group. In an embodiment, the chelator group is covalently bonded to a polymer. In an embodiment, the chelator group is covalently bonded to a chiral selector ligand. The present invention is also directed to methods of modifying inorganic oxide particles with a chelator group. The present invention is also directed to methods of eluting Lewis base containing solutes using a column with inorganic oxide particles that have been modified with a chelator group.

DRAWINGS

The invention may be more completely understood in connection with the following drawings, in which.

Figure 11A:
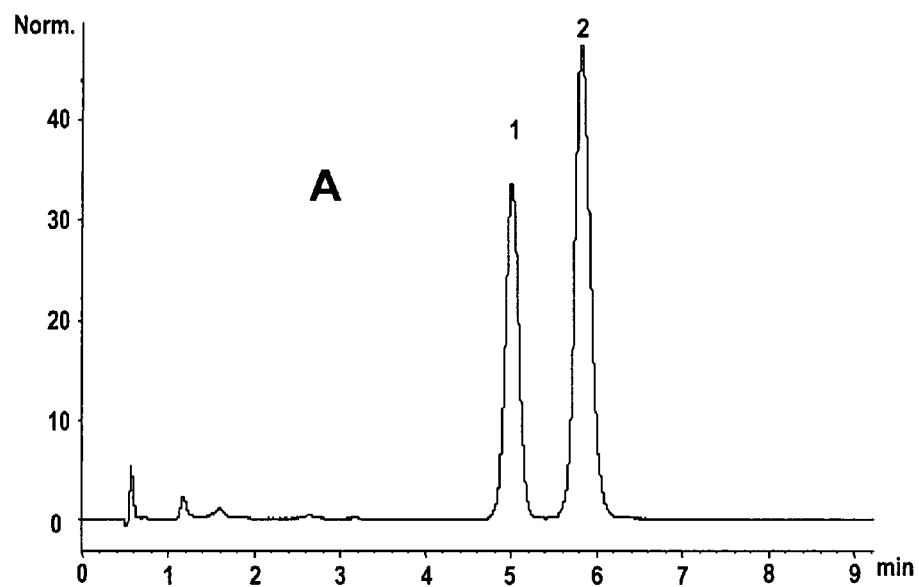
Figure 11B:
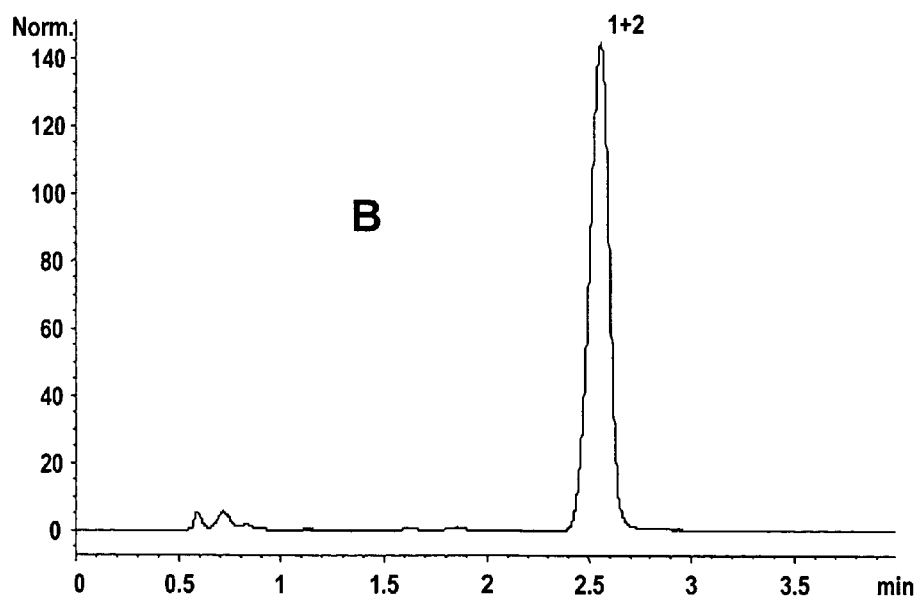

FIG. 11 compares the separation of ethylbenzene and p-xylene on CCM-PBD coated carbon clad zirconia stationary phase and PBD coated zirconia stationary phases.

Figure 12:
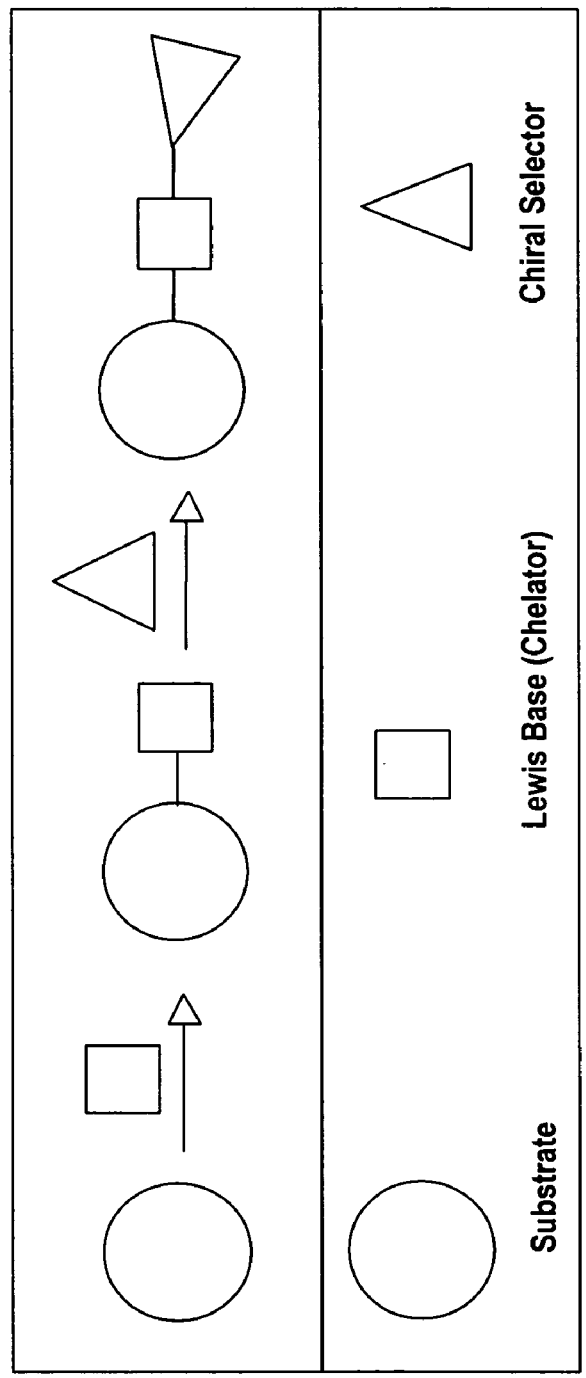

FIG. 12 is an overview of the method for bonding chiral selector ligands to zirconia using a Lewis acid-base chelator.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

Figure 1:
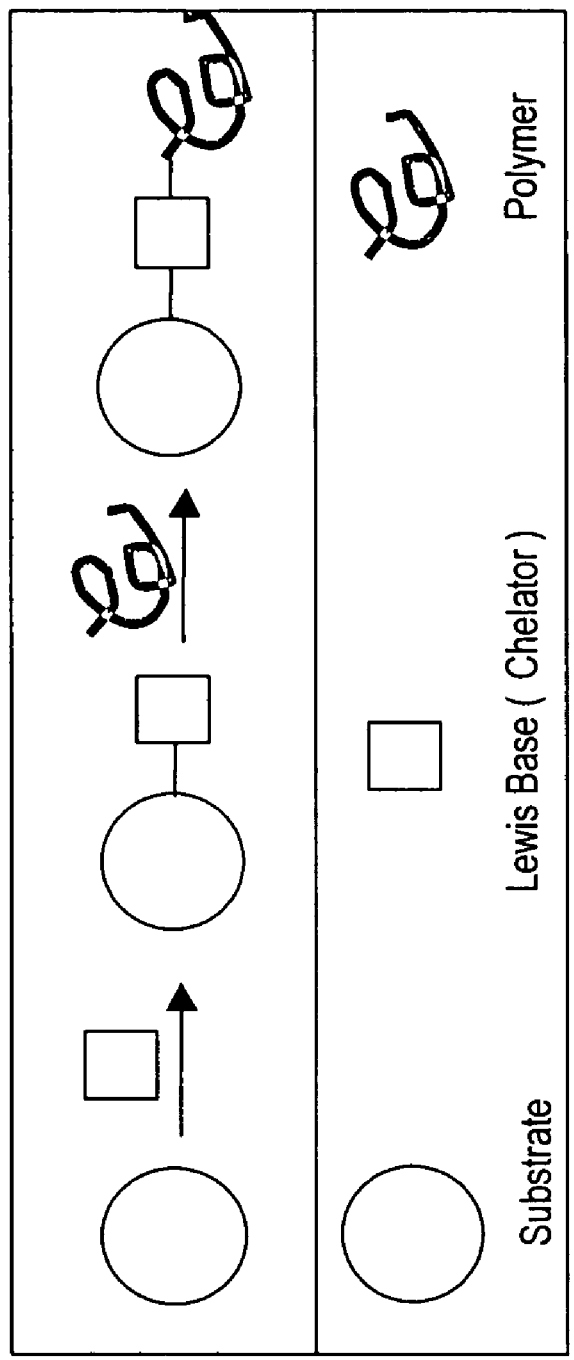
FIG. 1 is an overview of the method for bonding polymers to zirconia using a Lewis acid-base chelator.

It has been surprisingly discovered that, in an embodiment, a chelator can be used to prevent or reduce the effects of Lewis acid sites on zirconia oxide particles with respect to solutes containing Lewis bases and to improve overall chromatographic performance. In an embodiment, the present invention is directed to attaching an appropriate chelator group to an inorganic oxide substrate through a Lewis acid-base reaction and then covalently bonding the desired polymer to the chelator group. In an embodiment, where zirconia is used as the inorganic oxide, covalently chelator-modified polybutadiene (CCM-PBD) coated zirconia can be produced. FIG. 1 shows the basic components and process in accordance with an embodiment of the invention.

In an embodiment, the present invention is directed to attaching an appropriate chelator group to an inorganic oxide substrate through a Lewis acid-base reaction and then covalently bonding a chiral selector ligand to the chelator group through an organic reaction. In an embodiment, the invention includes inorganic oxide particles that are bound to a polyphosphate chelator group that is covalently bound to a chiral selector ligand. FIG. 12 shows the basic components and process in accordance with an embodiment of the invention.

While full examples of the modification process are provided below in examples 1, 7, and 11, an overview of the process in accordance with an embodiment of the invention will now be provided.

Modification Process Overview

In an embodiment for producing inorganic oxide particles that are bound to chelators, which in turn are covalently bound to polymers, starting with a bare inorganic oxide particle, a solution of a chelator is added such that it reacts with the surface of the inorganic oxide particle. After this step the particles are washed and then dried. Then a solution is added that will later allow the chelator to covalently bind to the polymer. One example of such a solution is allyl iodide solution to which 1,2,2,6,6-pentamethylpiperidine (as a sterically hindered base) is then added. This solution is allowed to react with the particles and then the particles are washed and dried again. Next, a solution of a polymer is added to the particles. After that, a cross-linking initiator is added and after drying and heating the chelator becomes covalently bound to a coating of polymer on the particles.

In an embodiment for producing inorganic oxide particles that are bound to polyphosphate chelators, which in turn are covalently bound to chiral selector ligands, starting with a bare inorganic oxide particle, a solution of a polyphosphate chelator is added such that it reacts with the inorganic oxide particle. After this step, the particles are washed and then dried. Next, a solution is added that will later allow the chelator to covalently bind to the stationary phase ligand. One example of such a solution is allyl iodide solution to which 1,2,2,6,6-pentamethylpiperidine is then added. This solution is allowed to react with the particles and then the particles are washed and dried again. Next, a solution of a suitable stationary phase, such as a chiral selector or hydrophobic polymer is added to the particles to tether the chelator and the stationary phase together. The stationary phase can be any number of molecules, peptide, polymers, protein, etc. that imparts a desired functionality to the surface of the particle for different modes of chromatographic use such as reverse-phase, ion-exchange, affinity, chiral, etc.

Modes of Use

Embodiments of the present invention are useful under a wide variety of conditions and protocols. By way of example, the present invention is useful in reversed-phase HPLC. The present invention is also useful in other modes of chromatography, including ion-exchange chromatography, reverse phase liquid chromatography, normal phase liquid chromatography, and hydrophilic interaction chromatography, etc. wherein the chromatography is conducted with inorganic oxides. In an embodiment, the present invention can be used with any sort of chromatography or chemical separation where Lewis base analytes may problematically interact with Lewis acid sites on the substrate.

Substrates

In an embodiment, the substrate of the present invention is porous or nonporous zirconia particles, porous or nonporous Titania particles, and porous or nonporous silica particles. In another embodiment, the substrate of the present invention may be any of zirconia, titania, hafnia, alumina, niobia, yttria, or magnesia, or mixed oxides thereof. In an embodiment, the substrate of the present invention is zirconia. In some embodiments, the particles are within the size range of 1-100 microns. In other embodiments, the particles may be within the size range of 0.5-200 microns. In still other embodiments, the particles may be from 0.1 micron to about 10 microns. In embodiments where the particles are porous, the pores may be from 50-2000 angstroms. In other embodiments where the particles are porous, the pores may be from 50-1500 angstroms. The particles may also be monolithic. The particles may be in the shape of microspheres or spherules, as well as non-spherical.

In some embodiments, the substrate of the present invention may be carbon coated or carbon-clad inorganic oxide particles. For example, the particles of the present invention can be clad or coated with a layer of pyrolytic carbon using a chemical vapor deposition ("CVD") process. The terms "pyrolytic carbon" and "CVD carbon" are generic terms relating to the carbon material that is deposited on the substrate by the thermal pyrolysis of a carbon-bearing vapor. The term "CVD carbon" describes the processing used, whereas the term "pyrolytic carbon" refers more to the type of carbon material that is deposited. While many methods of applying pyrolytic carbon to a substrate can be used in the preparation of carbon-clad particles, the carbon cladding is generally applied in a manner that results in substantial carbon coverage of the surface of the microspheres. Funkenbusch et al. (U.S. Pat. No. 5,346,619) describes one method for producing carbon clad inorganic oxide particles, the disclosure of which is herein incorporated by reference.

Any carbon source that can be vaporized and which will carbonize on the surface of the particles can be employed to deposit a carbon cladding via CVD. Useful carbon sources include hydrocarbons such as aromatic hydrocarbons, e.g., benzene, toluene, xylene, and the like; aliphatic hydrocarbons, e.g., heptane, cyclohexane, substituted cyclohexane butane, propane, methane, and the like; unsaturated hydrocarbons; branched hydrocarbons (both saturated and unsaturated), e.g., isooctane; ethers; ketones; aldehydes; alcohols such as heptanol, butanol, propanol, and the like; chlorinated hydrocarbons, e.g., methylene chloride, chloroform, trichloroethylene, and the like; and mixtures thereof. The carbon source may be either a liquid or a vapor at room temperature and atmospheric pressure although it is employed in a CVD process in vapor form. If the carbon source is a liquid with low volatility at room temperature, it may be heated to produce sufficient vapor for the deposition. In general, the choice of the deposition temperature, pressure, and time conditions are dependent on the carbon source employed and the nature of the metal oxide. The thickness of the carbon cladding over the surface of the metal oxide particle ranges from the diameter of a single carbon atom (a monatomic layer), to about 20 Angstroms.

Chelator

In an embodiment, the chelator of the present invention is a compound having two functions: (1) at least one Lewis base metal site chelator group such as OH, COOH, COOR, $PO_3H$, $PO_2H$, POH, SiH, or SiCl, and (2) another reactive group such as OH, NH, $NH_2$, COOH, and/or a double bond. Examples of suitable chelators include EDTPA (N,N,N',N'-ethylenediaminetetra(methylenephosphonic acid)) and PEI (poly(ethyleneimine)). In some embodiments, mixtures of different chelators can be used.

In an embodiment, the chelator of the present invention is a polyphosphate chelator. Polyphosphate chelators include EDTPA (N,N,N',N'-ethylenediaminetetra(methylenephosphonic acid)), phytic acid, methylene phosphonic acid, methylene diphosphonic acid, phospholipids, 2-[hydroxy(methyl) phosphoryl]ethyl(methyl)phosphinic acid, pyrrolidine-2,2-diylbis(phosphonic acid), 1-Hyfroxyethylidenedi (phosphonic acid), 1,3-diyl[bis]4,1-phenylene (difluoromethylene)bis(phosphonic acid), ENTMP (N,N,N-,N-ethylene diaminotetra methylene phosphonic acid), TENTMP (N,N,N-,N-triethylene diamine tetra (methylene phosphonic acid)), NTMP (Nitrilotris(Methylene Phosphonic acid)), and HDTMP (Hexamethylenediaminetetra(methylene phosphonic acid).

Chelators of the invention may also include naproxen, N-(phosphonomethyl)glycine, 2-aminoadipic acid, and (18-crown-6)-2,3,11,12-tetracarboxylic acid.

Polymers and Polymerization

The polymer of the present invention is a compound having at least a functional group such as, NH, $NH_2$, COOH, and/or a double bond. In some embodiments, the polymer of the invention may be a hydrophobic polymer. For example, polybutadiene (PBD) may be used. In another embodiment, polystyrene may be used. Other hydrophobic polymers that may be used include: polyhexamethylenevinylene, poly(4-vinylbiphenyl), poly(2-vinylnaphthalene), poly(4-methylstyrene), and polylimonene. In some embodiments, the polymer of the invention may be a hydrophilic polymer. Suitable hydrophilic polymers include polyvinylalcohol, poly(ethyleneglycol), polyvinylpyrollidone, polyethyleneimine, poly (butadiene maleic acid), polysiloxane, poly-1-histidine, or a polysaccharide (including cellulose and dextran).

Other polymers that may be used include, poly (ethyl methacrylate) and other methacrylates, polyaniline, polyethylene, polypropylene, poly(styrene-co-divynlbenzene), poly (vinyl acetate), and the like. In some embodiments, such as where ion-exchange chromatography is contemplated, suitable polymers may include aminocellulosics such as chitosan (polyglucoseamine), copoylmers of acrylamide and cationic derivatives (esters) of acrylic/methacrylic acid such as acrylamide/dimethylaminoethylmethacrylate copolymer, copolymers of diethylenetriamine, triethylenetetramine, ethylenediamine, which have been chain extended with epichlorohydrin, polyamidoamines (e.g. adipic acid/diethylenetriamine condensation polymers, other monomers such as caprolactam, dimethyladipate, triethylenetetramine), poly (diallyldimethulammonium chloride), cationic starch (yellow corn, tapioca, potato, waxymaize corn starch derivatized with diethylamine ethyl chloride hydrochloride or epoxy propyl trimethylammonium chloride or other quaternary derivatizing reagent), epoxydized polyamide resin (contain azetidinunium functionality, e.g. adipic acid/diethylenetriamine/ epichlorohydrin), acrylamide/diallyldimethylammonium chloride copolymers (e.g. cationic polyacrylamide), glycoxalated version of cationic polyacrylamide, cationic (grafted) cellulose derivatives, all polymers of diethyletriamine and ethylenediamine (such as for example PEI, KYMEME and RETEN) (KYMEME and RETEN are made by Hercules (Delaware, USA), comonomers of amines (for example glysine and lysine), any copolymer of polyamino acids that have lysine, hystidine or arganine and any other amino acid, and polyallylamines. Cross-linkers for polyamine compounds that can be used include: any dihaloalkane: for example 1,3 dibromopropane, 1,3 dichloropropane, 1,3 diiodopropane, and all the way up to 12 carbons, 1,4-dibromobenzene (and other halogenated versions), 1,4-dibromo-1,4 butanediol (hydrophillic), 1,4-dibromo-2,3-butanedione (hydrophillic), 2,6-bis(chloromethyl)pyridine (may be particularly useful on poly-L-lysine for a chiral stationary phase), 1,8-bis(bromomethyl)naphthalene (hydrophobic) (may be useful on poly-L-lysine for a chiral stationary phase), 2,2'-bis(bromomethyl-1,1'-biphenyl) (hydrophobic) (may be useful on poly-L-lysine for a chiral stationary phase), glutaraldehyde, 4,4'-diisothiocyantobiphenyl-2,2'-disulfonic acid and other diisothicyanates and diisothionates, bis-diazobenzene-2,2'-disulfonic acid, thiophosgene, succinic anhydride (other dianhydrides), any diacid chloride, and 1-cyclohexyl-3-(2-morpholinoethyl)-carbodiimide metho-p-toluene.

In those embodiments where cation-exchange is contemplated, any polymer with a carboxylic acid, phosphonic acid, or sulfonic acid group that has a benzene ring or is an alkene could be used.

In some embodiments, the polymer may be a homopolymer, while in other embodiments the polymer may be a heteropolymer. In other embodiments, the polymer coating may be mixtures of different hetero or homo polymers. One of skill in the art will appreciate that many different polymers may be used.

The initiator of the present invention is a compound used to produce free radicals to initiate the polymerization by crosslinking. Examples of suitable initiators include DCP (dicumyl peroxide) and AIBN (2,2'-Azobisisobutyronitrile). Other common initiators such as benzoyl peroxide may also be used. One of skill in the art will appreciate that many different initiators, including many different organic peroxides and diazo compounds, may be used.

Chiral Selector Ligands

Chiral selector ligands of the present include those that can be covalently bound to the chelator group. In an embodiment, the chiral selector ligand includes compounds having at least a functional group such as, NH, NH2, COOH, a double bond, and the like and at least one chiral center. By way of example, chiral selector ligands of the invention may include DNP-PG (3,5-dinitrobenzoyl-phenylglycine), DNB-LEU (3,5-dinitrobenzoyl-leucine), DNB-PRO (3,5-dinitrobenzoyl-proline), NAP-VAL (naphthoyl-valine), 1 or 2-NAP-LEU (naphthoyl-leucine),and NAP (naproxen). The chiral selector ligand may also include those referred to as "Whelk-O 1" ((3R,4R)-4-(3,5-dinitrobenzamido)-1,2,3,4-tetrahydrophenanthrene or ((3S,4S)-4-(3,5-dinitrobenzamido)-1,2,3,4-tetrahydro-phenanthrene) (structure I) and "α-Burke 2" (derived from dimethyl N-3,5-dinitro-benzoyl-a-amino-2,2-dimethyl-4-pentenyl phosphonate) (structure II), and derivatives of these.

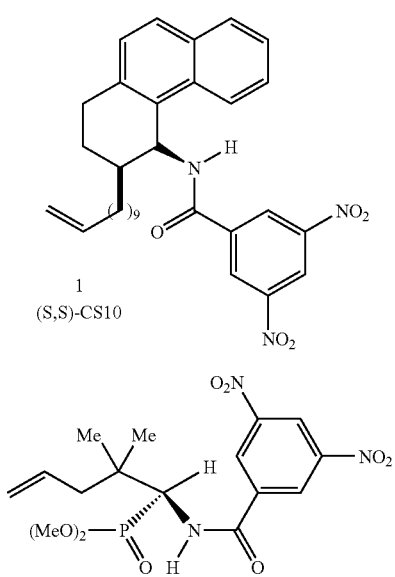

Structure I 1
(S,S)-CS10

Structure II

The present invention may be better understood with reference to the following examples. These examples are intended to be representative of specific embodiments of the invention, and are not intended as limiting the scope of the invention.

EXAMPLES

Example 1

Preparation of Chelator-Modified PBD Coated Zirconia Stationary Phase

Step 1. A fresh solution was prepared by adding 3.0 g of EDTPA to 500 ml of HPLC grade water into 1000 ml flask. It was refluxed for 2 hours to dissolve the EDTPA and then cooled down to room temperature. The solution was filtered to remove the undissolved material and residuals. 150 g of bare zirconia (5 μm or 3 μm can be used) was placed in a 1000 ml, 2-necked round bottom flask, and the 500 ml of the EDTPA solution was added. The particles were thoroughly suspended by swirling the flask, then the mixture was sonicated under vacuum for 30 minutes. The flask was attached to a water-cooled condenser and set up to a heating mantle set to level 4.5. Nitrogen was bubbled through the mixture at 25 mL/min by running a nitrogen-line through a stopper and into the flask through one of the necks. The solution was stirred with a stir bar (Medium size). The mixture was monitored closely until it came to a gentle boil. The mixture was heated at reflux for 4 hours. The mixture was transferred to a membrane filter and filtered. The particles were washed with 3×300 ml of HPLC grade water followed by 3×300 ml of 100% HPLC grade ethanol. The particles were dried at room temperature under vacuum and then at 120° C. for 3 hours.

The dried particles were added into a 1000 ml round bottom flask. A solution of allyl iodide (238325-25G, lot 09128Ka) in isopropyl alcohol (IPA) was made by dissolving 15 g of allyl iodide in 450 ml of IPA in a 250-ml beaker. 1.500 ml of 1,2,2,6,6-pentamethylpiperidine (Aldrich, 27463-1, lot #08531JR PU) was added to the allyl iodide solution with swirling and heated with hot water. This solution was added into the particle flask. The suspension was sonicated under vacuum for 10 minutes. The flask was placed on a rota-vap (rotary evaporator) with the temperature set to 65° C. and rotated for rotated for 20 hours at 20 rpm (cover bath with foil to help with evaporation of H2O). After rotating overnight, the flask was removed from the rota-vap and the particles were collected by vacuum filtration and washed with 3×300 ml ethanol followed by 3×300 ml HPLC grade $H_2O$, and 3×300 ml HPLC grade Ethanol. Air was pulled through the cake of the washes until the particles were dry. The particles were dried in a vacuum oven (23 torr) at 110° C. for 4 hrs to remove excess moisture.

Step 2. 10.0 g PBD (polybutadiene) (batch #09913 BA) was added to a 500 ml round bottom flask. 75 ml of HPLC grade Hexane was added and it was swirled until the PBD was fully dissolved. 50 g of the zirconia particles from Step 1 were added to the 500 ml round bottom flask and the slurry was sonicated for a few minutes under vacuum, breaking the vaccum periodically. 8.04 g of 20 mg/ml AIBN (azobisisobutyronitrile, Aldrich, catalog no. 441090-100G, batch no. 12603CB) hexane solution was added (DCP (dicumyl peroxide, Aldrich) hexane solution can also be used). The slurry was sonicated under vacuum for 5 minutes, breaking vacuum every minute to allow infiltration of particle pores. The flask was rotated on a rotary station for 2 hours. The solvent was evaporated at 50° C. with a vacuum of 14 in. Hg over a period of 15 minutes using a rotary evaporator. The material was allowed to continue to dry for 15 minutes 50° C. with a vacuum of 25 in. Hg.

The particles were transferred to a clean quartz tube. The quartz tube was placed in a rotating furnace. The tube was connected to an ultra pure nitrogen source and flushed for 30 min. The particles were dried at 80° C. (use 120° C. if DCP is used as the initiator) for 5 hours, the temperature was raised to 100° C. (use 160° C. if DCP is used as the initiator) and cross-linking took place for 1 hour while running ultra pure nitrogen through the tube.

After cross-linking, the particles were transferred from the tube to the Soxhlet extractor. 500 ml of toluene was used for 8 hours. Particles were collected on a membrane filter and rinsed with 2×200 ml of ethanol. Air was pulled through the cake for 3 hours until the particles were dry. The particles were resuspended in 300 ml 50/50 0.05 M $HNO_3$/THF. The solution was sonicated under vacuum for 5 minutes, breaking vacuum once every minute. The wash was repeated once, and 300 ml 50/50 THF/water was used to wash the particles. The particles were then rinsed while on filter with 2×200 ml HPLC ethanol, and the particles were dried by pulling air through the cake for 3 hours.

Example 2

Separation of Benzoic Acids on CCM-PBD Coated Zirconia

Figure 2:
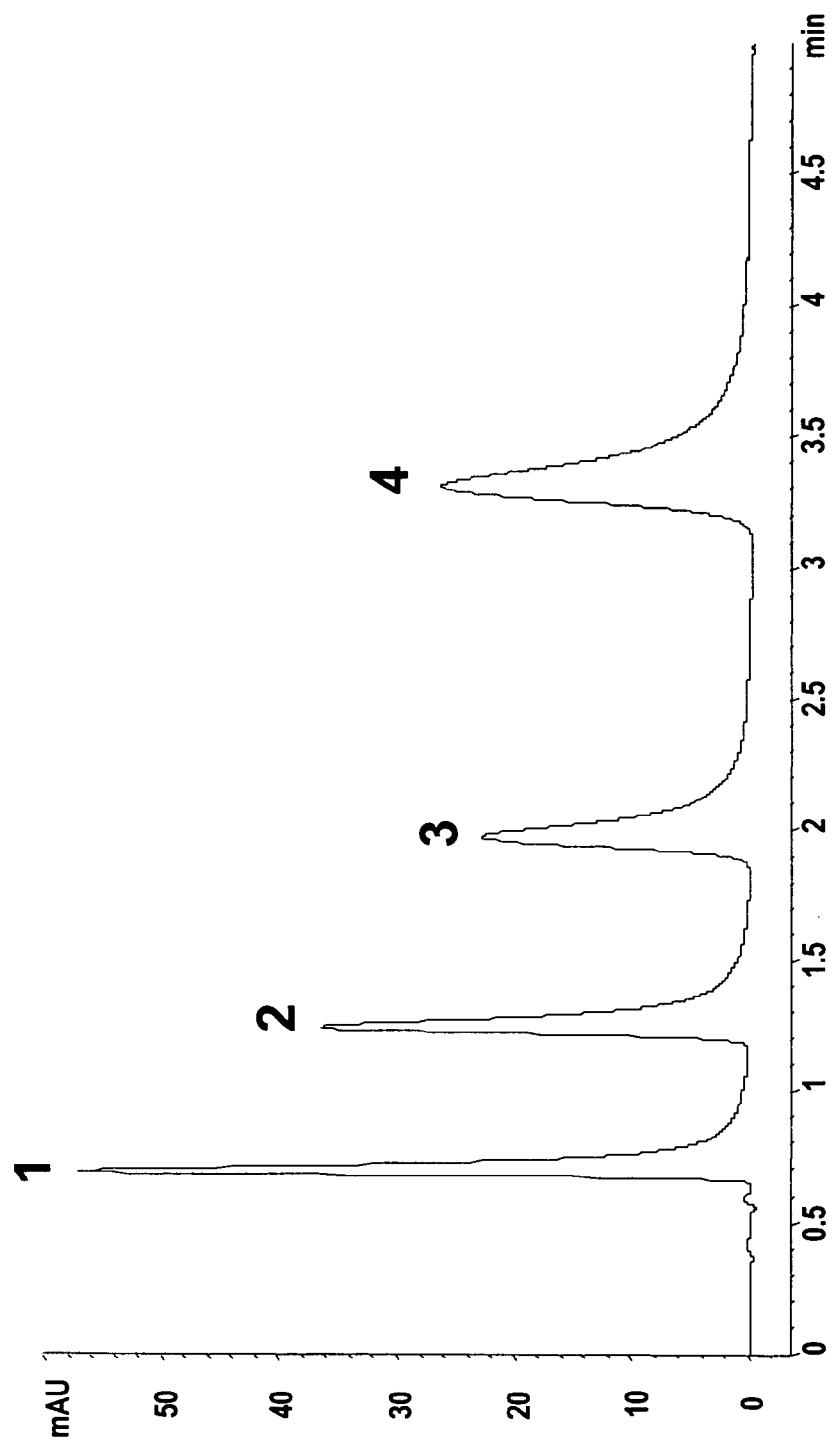
FIG. 2 shows the separation of four para-substituted benzoic acids (4-hydroxybenzoic acid, 4-ethoxybenzoic acid, 4-propoxybenzoic acid, and 4-butoxybenzoic acid) on covalently chelator-modified PBD (CCM-PBD) coated zirconia in a simple aceto nitrile/water mobile phase.

The covalently chelator-modified PBD (CCM-PBD) coated zirconia was compared with unmodified PBD zirconia using some Lewis base probe solutes. Alkoxybenzoic acids, which interact strongly with unmodified PBD coated zirconia if an appropriate Lewis base mobile phase additive (such as phosphate) is not employed, were used as the Lewis base solutes. FIG. 2 shows the separation of four para-substituted benzoic acids (4-hydroxybenzoic acid, 4-ethoxybenzoic acid, 4-propoxybenzoic acid, and 4-butoxybenzoic acid) on CCM-PBD coated zirconia in a simple aceto nitrile/water mobile phase (35/65 ACN/Water, Flow rate: 1 mL/min, 254 nm UV, 1 μl injection). FIG. 2 shows that these solutes are well resolved on the modified column with no mobile phase additives being present. Separations of Lewis base solutes from left to right in FIG. 2 are as follows: (1) 4-hydroxybenzoic acid, (2) 4-ethoxybenzoic acid, (3) 4-propoxybenzoic acid, and (4) 4-butoxybenzoic acid on chelator-modified PBD coated zirconium.

Under the same chromatographic conditions, an unmodified PBD coated zirconia phase showed no elution of these compounds (not shown).

Figure 3A:
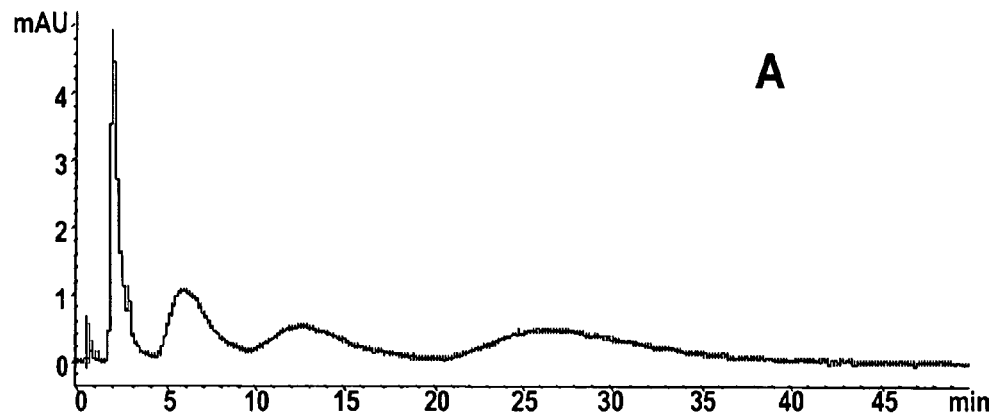
FIG. 3A shows the separation of four para-substituted benzoic acids (4-hydroxybenzoic acid, 4-ethoxybenzoic acid, 4-propoxybenzoic acid, and 4-butoxybenzoic acid) on an unmodified PBD coated zirconia in an acetate buffer mobile phase.
Figure 3B:
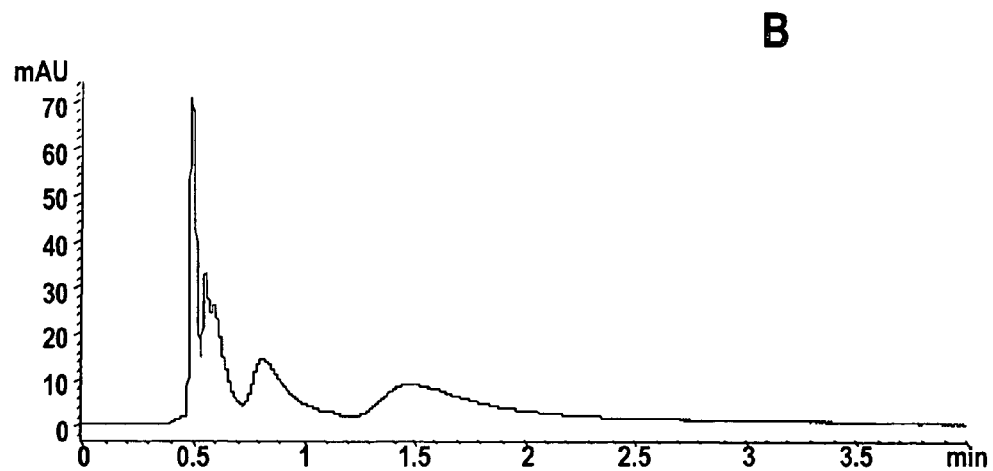
FIG. 3B shows the separation of four para-substituted benzoic acids (4-hydroxybenzoic acid, 4-ethoxybenzoic acid, 4-propoxybenzoic acid, and 4-butoxybenzoic acid) on an unmodified PBD coated zirconia in a phosphate buffer mobile phase.

FIGS. 3A and 3B show separations of alkoxybenzoic acids eluted in order without a strong Lewis base in the mobile phase (1) 4-hydroxybenzoic acid, (2) 4-ethoxybenzoic acid, (3) 4-propoxybenzoic acid, and (4) 4-butoxybenzoic acid on an unmodified PBD column. In FIG. 3A the mobile phase was 30/70 ACN/100 mM ammonium acetate at pH 5. In FIG. 3B the mobile phase was 15/85 ACN/25 mM ammonium phosphate monobasic at pH 6. The other conditions for 3A and 3B were as follows: flow rate was 1 mL/min, 254 nm UV, 1 ul injection.

The peak shapes using the covalently chelator-modified PBD coated zirconia, as shown in FIG. 2, are better than those shown in FIG. 3A (acetate buffer) and better than those shown in FIG. 3B (phosphate buffer).

Example 3

Separation of Small Organic Compounds on CCM-PBD Coated Zirconia

Figure 4A:
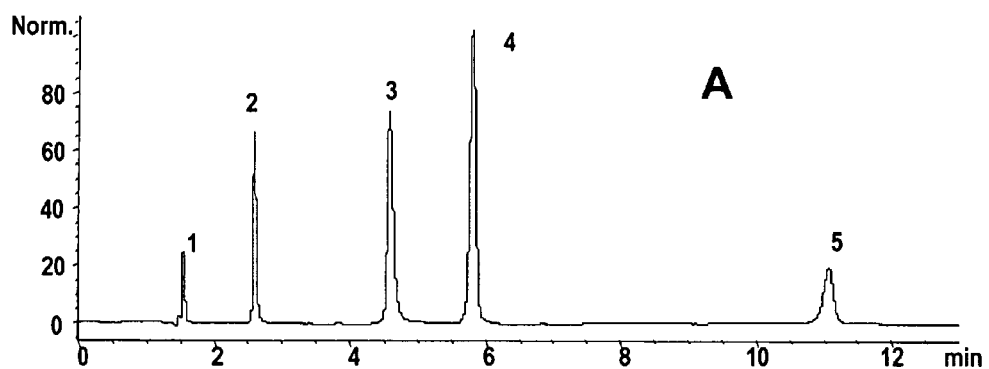
FIG. 4A shows the separation of (1) acetone, (2) phenol, (3) 4-hydroxyphenol, (4) anisol, and (5) toluene on CCM-PBD coated zirconia in a simple mobile phase comprised of acetonitrile/water.
Figure 4B:
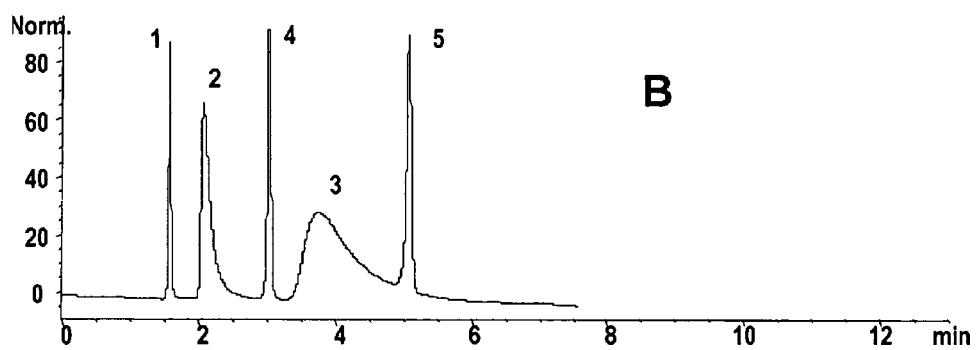
FIG. 4B shows the separation of (1) acetone, (2) phenol, (3) 4-hydroxyphenol, (4) anisol, and (5) toluene on unmodified PBD coated zirconia using a simple acetonitrile/water mobile phase.

The effect of surface activation of PBD coated zirconia was demonstrated by separating a mixture of small organic compounds including (1) acetone, (2) phenol, (3) 4-chlorophenol, (4) anisole, and (5) toluene. The conditions where as follows: 35/65 ACN/water, Flow rate: 1 mL/min, 254 nm UV, 5 µl injection. FIGS. 4A and 4B show the separation comparison between a CCM-PBD coated zirconia and an unmodified PBD coated zirconia. Both phenol and 4-chlorophenol can interact with the Lewis acid sites on zirconia and therefore have a poor peak shape on unmodified zirconia columns. However, the peak shapes for phenol and 4-chlorophenol were much improved on the CCM-PBD coated zirconia column (as shown in FIG. 4A). Interestingly, the elution order for 4-chlorophenol and anisole switched from the modified to the unmodified columns. This data suggests that the CCM-PBD coated zirconia column has different selectivity compared to the unmodified PBD zirconia column.

Example 4

Separation of Basic Drugs on Chelator-Modified PBD Coated Zirconia

Figure 5:
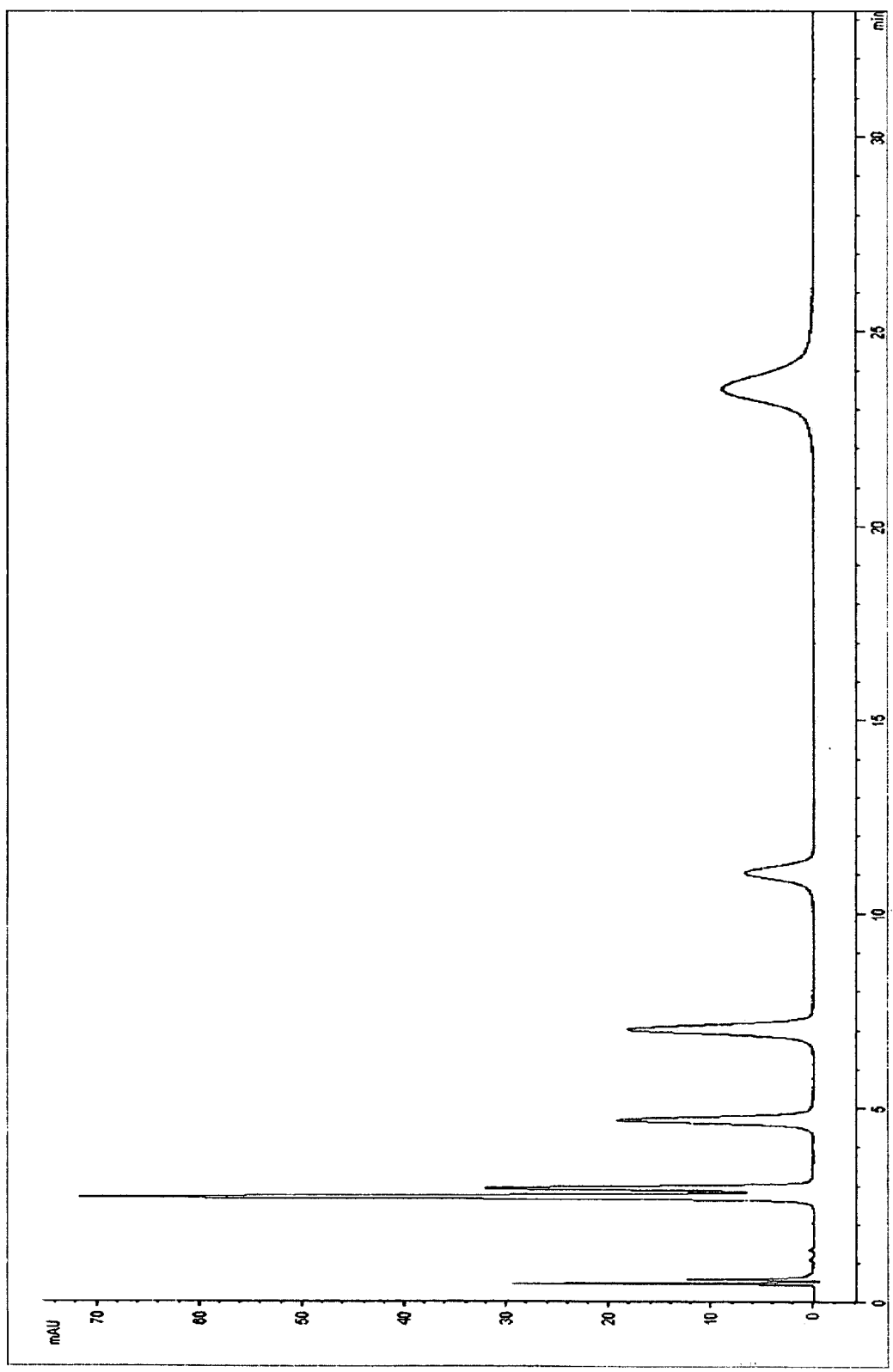
FIG. 5 shows the separation of acetone, methapyrilene, pyrilamine, bromphenriamine, doxpin, amtriptyline, and nortryptyline on CCM-PBD coated zirconia.

FIG. 5 show the excellent separation of basic drugs on the CCM-PBD coated zirconia. FIG. 5 shows the separation of basic drugs on the CCM-PBD coated zirconia. Solutes eluted in order from left to right were: acetone, methapyrilene, pyrilamine, bromphenriamine, doxpin, amtriptyline, nortryptyline. The conditions were as follows: mobile phase—72/28 MeOH/25 mM ammonium phosphate dibasic pH=6, flow rate: 1 mL/min, 254 nm UV, 5 µl injection.

Figure 6A:
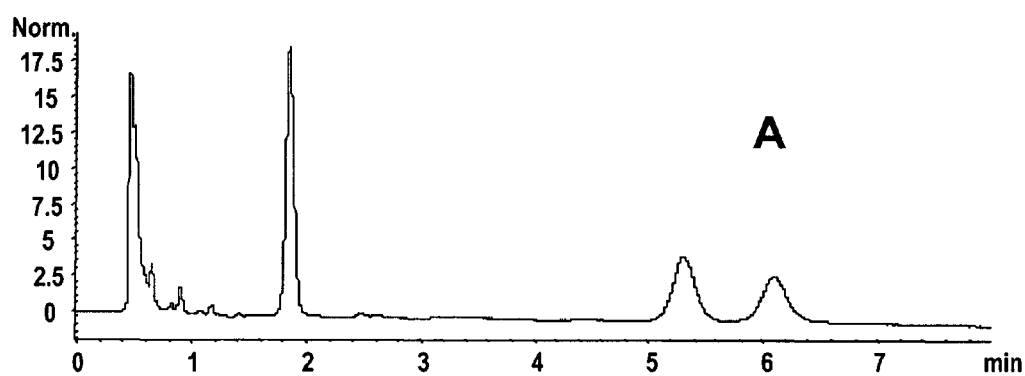
FIG. 6A shows the separation of acetone, clozapine, norclozapine, and amoxapine on CCM-PBD coated zirconia.
Figure 6B:
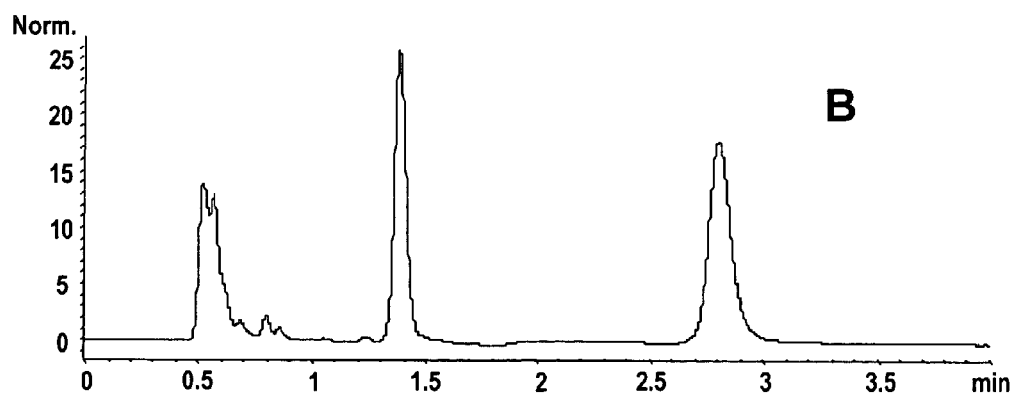
FIG. 6B shows the separation of acetone, clozapine, norclozapine, and amoxapine on chelator-modified PBD coated zirconia, wherein the chelator is not covalently bonded to PBD.

FIGS. 6A and 6B show the comparison between CCM-PBD coated zirconia and a chelator-modified PBD coated zirconia (ZIRCHROM-EZ), wherein the chelator is not covalently bonded to PBD. The solutes eluted in order from left to right are: acetone, clozapine, norclozapine, and amoxapine. The conditions were as follows: mobile phase—65/35 ACN/100 mM ammonium acetate (pH 5), flow rate: 1 mL/min, 254 nm UV, 5 ul injection.

FIGS. 6A and 6B show that norclozapine and amoxapine can be fully resolved on CCM-PBD coated zirconia (6A) but not on ZIRCHROM-EZ (6B). The peaks are very symmetric. Typically the peaks for these drugs on the C18 silica column are tailed.

Example 5

Retention Comparison Between CCM-PBD Coated Zirconia and Unmodified PBD Coated Zirconia Retention comparison was conducted between (7A) CCM-PBD coated zirconia and (7B) unmodified PBD coated zirconia. The solutes tested were from left to right as follows: (1) acetone (2) phenol, (3) 4-hydroxyphenol, (4) anisol, and (5) toluene. The conditions were as follows: mobile phase—35/65 ACN/water, flow rate: 1 mL/min, 254 nm UV, 5 ul injection.

Figure 7A:
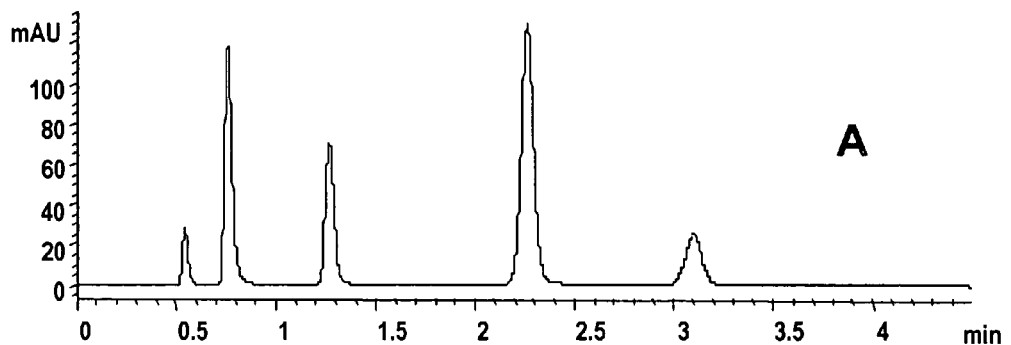
FIG. 7A shows the retention of specific solutes on CCM-PBD coated zirconia.
Figure 7B:
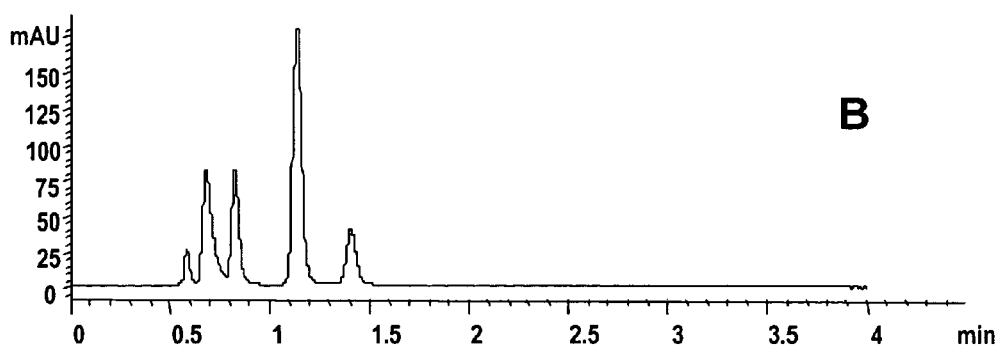
FIG. 7B shows the retention of specific solutes on unmodified PBD coated zirconia.

FIGS. 7A and 7B show that a CCM-PBD coated zirconia stationary phase is much more retentive than ummodified PBD coated zirconia stationary phases and is almost the same as C18 silica based stationary phases for the neutral compounds.

Example 6

Gradient Reproducibility of the CCM-PBD Coated Zirconia

Gradient reproducibility of the CCM-PBD coated zirconia was tested. Solutes eluted in order from left to right on FIG. 8 were: (1) acetone (2) benzonitrile, (3) methyl benzoate, (4) anisol, and (5) toluene. Conditions were as follows: gradient elution—100% water to 100% ACN in 30 min and back to 100% water in 30 min., flow rate 1 mL/min, 254 nm UV, 5 µl injection.

Figure 8:
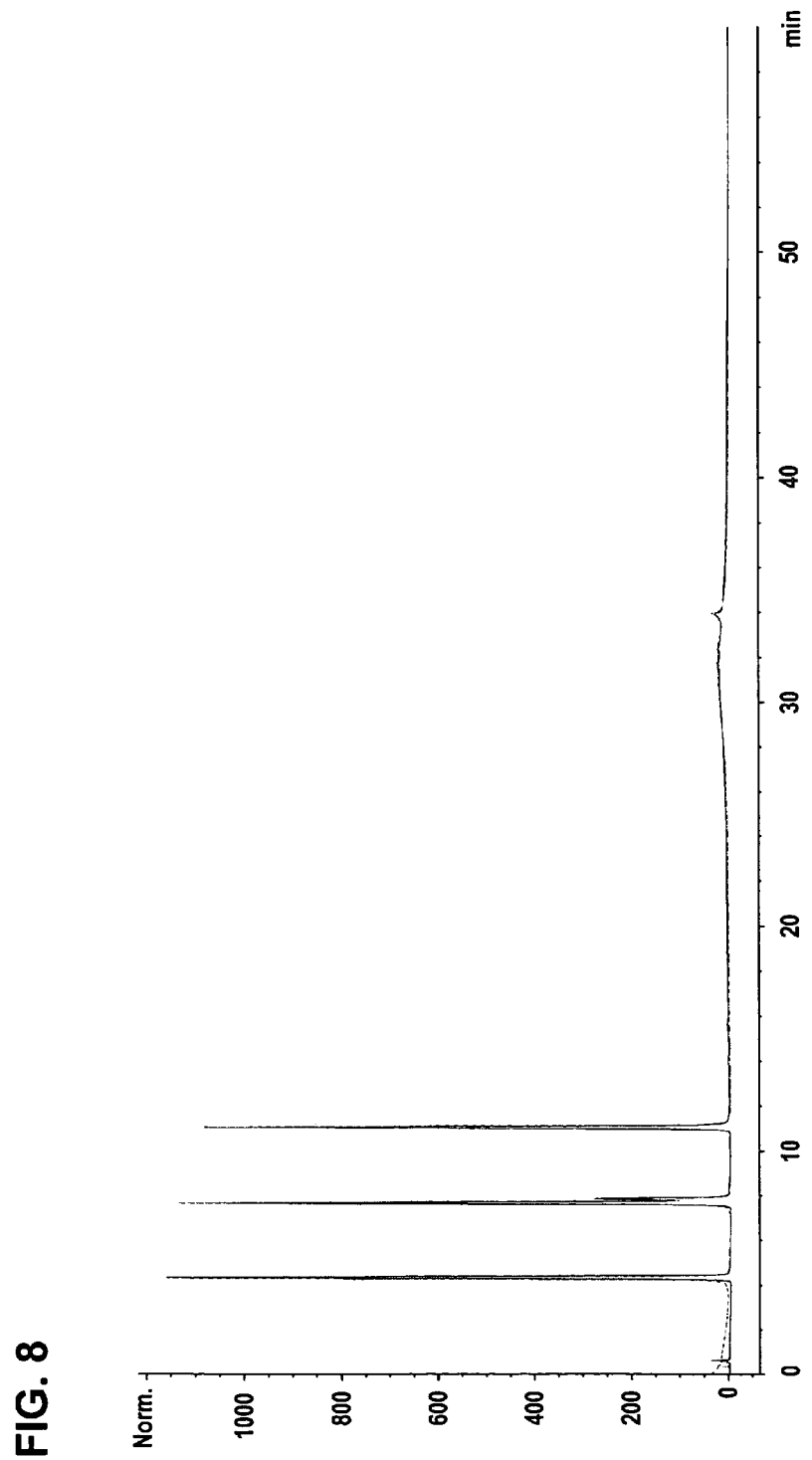
FIG. 8 shows the gradient reproducibility of the CCM-PBD PBD coated zirconia.

FIG. 8 shows the excellent gradient-elution reproducibility of the CCM-PBD coated zirconia from 100% water to 100% ACN. The data indicate that there is no PBD bleeding from the column, which means the stationary phase is very stable under water/ACN condition at ambient temperature. Typically there is PBD bleeding on unmodified PBD coated zirconia (data not shown).

Example 7

Preparation of CCM-PBD Coated Carbon Clad Zirconia Stationary Phase

The same coating process described above can be applied to a carbon-clad zirconia substrate particle, which is described below:

Step 1. A fresh solution was prepared by adding 3.0 g of EDTPA to 500 ml of HPLC grade water into 1000 ml flask. It was refluxed for 2 hours to dissolve the EDTPA and then cooled down to room temperature. The solution was filtered to remove the undissolved material and residuals. 100 ml of ethanol and 50 g of carbon-clad zirconia (5 µm or 3 µm can be used) was added to a 1000 ml, 2-necked round bottom flask. The particles were suspended and sonicated for 10 minutes under vacuum. 400 ml of the EDTPA solution was added. The particles were suspended by swirling the flask and then sonicated under vacuum for 5 minutes. The flask was attached to a water-cooled condenser and set up to a heating mantle set to level 4.5. Nitrogen was bubbled through the mixture at 25 mL/min by running a nitrogen-line through a stopper and into the flask through one of the necks. The solution was stirred with a stir bar (Medium size). The mixture was monitored closely until it came to a gentle boil. The mixture was heated at reflux for 4 hours. The mixture was transferred to a membrane filter and filtered. The particles were washed with 3×200 ml of HPLC grade water followed by 3×200 ml of 100% HPLC grade ethanol. The particles were dried at room temperature under vacuum and then at 120° C. for 3 hours.

The dried particles were added into a 1000 ml round bottom flask. A solution of allyl iodide (238325-25G, lot 09128Ka) in IPA was made by dissolving 2.5 g of allyl iodide in 150 ml of IPA in a 250-ml beaker. 0.21 g of 1,2,2,6,6-pentamethylpiperidine (Aldrich, 27463-1, lot #08531JR PU) was added to the allyl iodide solution with swirling and heated with hot water. This solution was added into the particle flask. The suspension was sonicated under vacuum for 10 minutes. The flask was placed on a rota-vap (rotary evaporator) with the temperature set to 65° C. and rotated for 20 hours at 20 rpm (cover bath with foil to help with evaporation of $H_2O$). After rotating overnight, the flask was removed from the rota-vap and the particles were collected by vacuum filtration and washed with 3×200 ml ethanol followed by 3×200 ml HPLC grade $H_2O$, and 3×200 ml HPLC grade Ethanol. Air was pulled through the cake of the washes until the particles were dry. The particles were dried in a vacuum oven (23 torr) at 110° C. for 4 hrs to remove excess moisture.

Step 2. 1.2 g PBD (polybutadiene) (batch #09913 BA) was added to a 500 ml round bottom flask. 75 ml of HPLC grade Hexane was added and it was swirled until the PBD was fully dissolved. 10 g of the zirconia particles from Step 1 were added to the 500 ml round bottom flask and the slurry was sonicated for a few minutes under vacuum, breaking the vaccum periodically. 1.0 g of 20 mg/ml AIBN (azobisisobutyronitrile, Aldrich, catalog no. 441090-100G, batch no. 12603CB) hexane solution was added (DCP (dicumyl peroxide, Aldrich) hexane solution can also be used). The slurry was sonicated under vacuum for 5 minutes, breaking vacuum every minute to allow infiltration of particle pores. The flask was rotated on a rotary station for 2 hours. The solvent was evaporated at 50° C. with a vacuum of 14 in. Hg over a period of 15 minutes using a rotary evaporator. The material was allowed to continue to dry for 15 minutes 50° C. with a vacuum of 25 in. Hg.

The particles were transferred to a clean quartz tube. The quartz tube was placed in a rotating furnace. The tube was connected to an ultra pure nitrogen source and flushed for 30 min. The particles were dried at 80° C. (use 120° C. if DCP is used as the initiator) for 5 hours, the temperature was raised to 100° C. (use 160° C. if DCP is used as the initiator) and cross-linking took place for 1 hour while running ultra pure nitrogen through the tube.

After cross-linking, the particles were transferred from the tube to the Soxhlet extractor. 500 ml of toluene was used for 8 hours. Particles were collected on a membrane filter and rinsed with 2×100 ml of ethanol. Air was pulled through the cake for 3 hours until the particles were dry. The particles were resuspended in 200 ml 50/50 0.05 M $HNO_3$/THF. The solution was sonicated under vacuum for 5 minutes, breaking vacuum once every minute. The wash was repeated once, and 200 ml 50/50 THF/water was used to wash the particles. The particles were then rinsed while on filter with 2×100 ml HPLC ethanol, and the particles were dried by pulling air through the cake for 3 hours.

Example 8

Figure 9A:
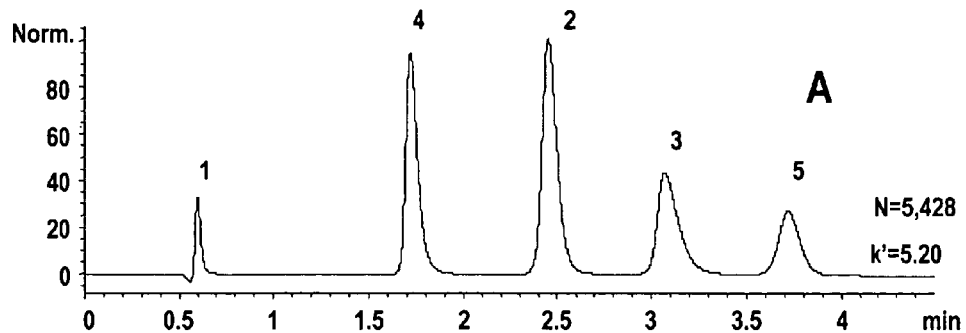
FIG. 9 shows a comparison between 1) a CCM-PBD coated carbon clad zirconia stationary phase, 2) a carbon clad zirconia stationary phase, and 3) a PBD coated zirconia stationary phase.
Figure 9B:
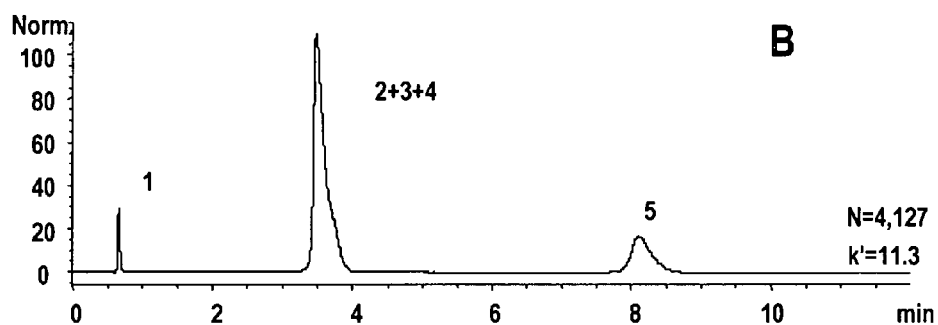
Figure 9C:
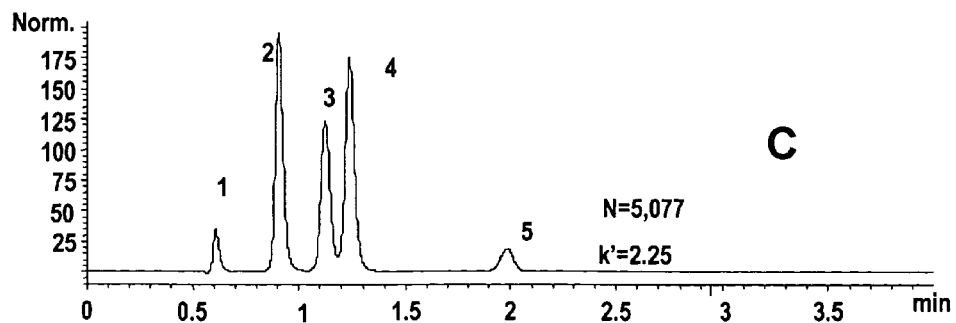

Comparison of CCM-PBD Coated Carbon Clad Zirconia, Carbon Clad Zirconia, and PBD Coated Zirconia in the Separation of Small Organic Probe Solutes FIG. 9 shows a comparison of the CCM-PBD coated carbon clad zirconia (SUPERCARB) column (A) with unmodified carbon clad zirconia (CARB) (B) and PBD coated zirconia (C). The solutes tested were 1) acetone, 2) benzonitrile, 3) methyl benzoate, 4) anisol, and 5) toluene. The conditions were as follows: mobile phase: 35/65 ACN/water, flow rate: 1 ml/min, temperature: 30° C., UV Detection: 254 nm. The CCM-PBD coated carbon clad zirconia showed higher column efficiency, and better band spacing than the other columns under these conditions and in general was more retentive than the other columns.

Example 9

Figure 10:
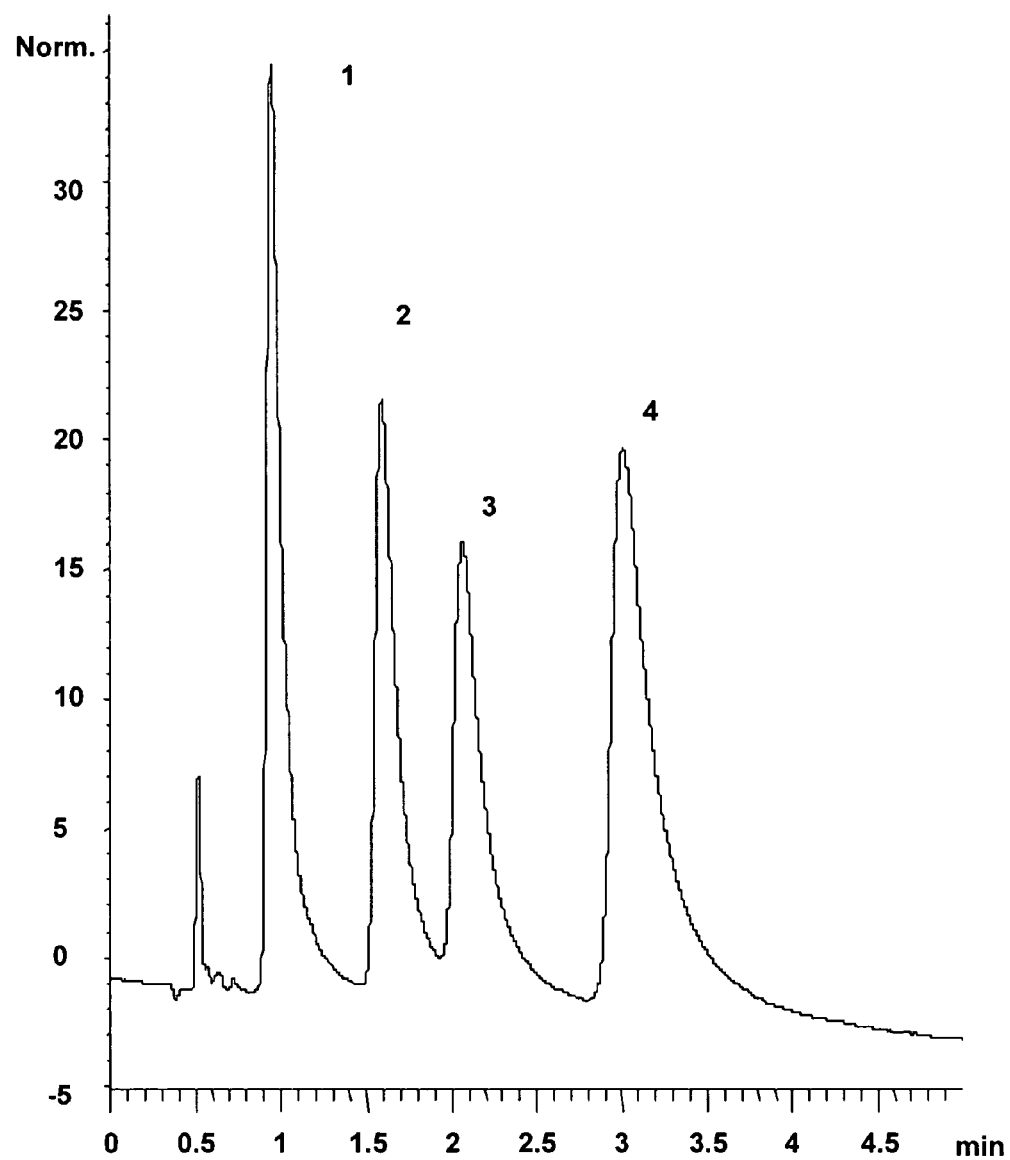
FIG. 10 shows that Lewis bases (such as carboxylates) can be eluted without adding a Lewis basic compound to the mobile phase, as is necessary with unmodified zirconia-based HPLC columns.

Separation of Lewis Basic Compounds without any Additives or Buffers in the Aqueous Portion of the Mobile Phase FIG. 10 shows that Lewis bases (such as carboxylates) can be eluted without the need to add a Lewis base additive to the mobile phase, as is necessary with unmodified zirconia-based HPLC columns. Rather, simple organic-water mixtures can be employed to elute these compounds. The following solutes were tested: 1) 4-hydroxybenzoic acid, 2) 4-ethoxybenzoic acid, 3) 4-propoxybenzoic acid, and 4) 4-butoxybenzoic acid. The conditions were as follows: mobile phase: 50/50 ACN/water, flow rate: 1 ml/min, temperature: 60° C., UV Detection: 254 nm, column: 5 cm×4.6 mm ID, 5 micron. Under these conditions no elution (over 1 hour of elution time) of the compounds was observed on an identically packed column of the carbon-substrate material (unmodified carbon clad zirconia) that was used to make the SUPERCARB (CCM-PBD coated carbon clad zirconia) column under identical HPLC conditions. Since the carbon-substrate column had not been exposed to a Lewis base it is believed that the carboxylate compounds were irreversibly bound to the Lewis acid sites on the column.

Example 10

Separation of Structurally Closely Related Compounds on CCM-PBD Coated Carbon Clad Zirconia Versus PBD Coated Zirconia FIG. 11 compares the separation of ethylbenzene and p-xylene on SUPERCARB (CCM-PBD coated carbon clad zirconia) (A) and PBD coated zirconia (B) phases. SUPERCARB is a 5 micron particle, while PBD coated zirconia is a 3 micron particle. The column dimensions were 50 mm×4.6 mm i.d. The conditions were as follows: flow rate=1 mL/min; mobile phase=35/65 acetonitrile/water; injection volume, 5 μl; column temperature, 30° C.

The separation is easily achieved on the SUPERCARB (CCM-PBD coated carbon clad zirconia) column, however both solutes co-elute on the PBD coated zirconia phase. It is known in the art that carbon-based HPLC supports have good chromatographic selectivity for structurally closely related compounds such as diastereomers, cis/trans compounds and the like. Thus the SUPERCARB material retains some of its selectivity for these closely related compounds, while having much greater column efficiencies than pure carbon-based HPLC columns. Since the 3 micron particle (PBD coated zirconia) is more chromatographically efficient, it is clear that the separation is not due to better efficiency, but better selectivity for these two structurally closely related compounds.

Example 11

Preparation of a Polyphosphate Chelator-Modified Chiral Selector Coated Zirconia Stationary Phase Step 1. A fresh EDTPA solution was prepared by adding 3.0 g of EDTPA to 500 ml of HPLC grade water into 1000 ml flask. It was refluxed for 2 hours to dissolve the EDTPA and then cooled down to room temperature. The solution was filtered to remove the undissolved material and residuals. 150 g of bare zirconia (5 μm or 3 μm can be used) was placed in a 1000 ml, 2-necked round bottom flask, and the 500 ml of the EDTPA solution was added. The particles were thoroughly suspended by swirling the flask, then the mixture was sonicated under vacuum for 30 minutes. The flask was attached to a water-cooled condenser and set up to a heating mantle set to level 4.5. Nitrogen was bubbled through the mixture at 25 mL/min by running a nitrogen-line through a stopper and into the flask through one of the necks. The solution was stirred with a stir bar (medium size). The mixture was monitored closely until it came to a gentle boil. The mixture was heated at reflux for 4 hours. The mixture was transferred to a membrane filter and filtered. The particles were washed with 3×300 ml of HPLC grade water followed by 3×300 ml of 100% HPLC grade ethanol. The particles were dried at room temperature under vacuum and then at 120° C. for 3 hours.

The dried particles were added into a 1000 ml round bottom flask. A solution of allyl iodide (238325-25G, lot 09128Ka) in isopropyl alcohol (IPA) was made by dissolving 15 g of allyl iodide in 450 ml of IPA in a 250-ml beaker. 1.500 ml of 1,2,2,6,6-pentamethylpiperidine (Aldrich, 27463-1, lot #08531JR PU) was added to the allyl iodide solution with swirling and heated with hot water. This solution was added into the particle flask. The suspension was sonicated under vacuum for 10 minutes. The flask was placed on a rota-vap (rotary evaporator) with the temperature set to 65° C. and rotated for rotated for 20 hours at 20 rpm (cover bath with foil to help with evaporation of H2O). After rotating overnight, the flask was removed from the rota-vap and the particles were collected by vacuum filtration and washed with 3×300 ml ethanol followed by 3×300 ml HPLC grade H$_2$O, and 3×300 ml HPLC grade Ethanol. Air was pulled through the cake of the washes until the particles were dry. The particles were dried in a vacuum oven (23 torr) at 110° C. for 4 hrs to remove excess moisture.

Step 2. A fresh solution of DNB-L-Leu (R-N-(3,5-dinitrobenzoyl)-L-leucine was prepared by adding 471 mg of DNB-L-Leu to 10 ml of HPLC grade THF in a 100 ml round bottom flask. The particles were added to the 100 ml round bottom flask and suspended by swirling the flask and sonicating the mixture for 2 minutes. 0.35 g of EEDQ were added with swirling. The mixture was swirled for another 8 hours at room temperature. The particles were filtered using a 0.45 μm membrane filter and washed with 3×5 ml aliquots of acetone and 3×5 ml aliquots of IPA. The particles were allowed to air-dry at room temperature.

The invention has been described with reference to various specific and preferred embodiments and techniques. However, it should be understood that many variations and modifications may be made while remaining within the spirit and scope of the invention.

We claim:

1. A particle for use in chromatography columns comprising:
    an inorganic oxide core,
    a cross-linked polymer coating surrounding the inorganic oxide core, and
    a chelator bonding the cross-linked polymer to the inorganic oxide core, the chelator covalently bonded to the cross-linked polymer.

2. The particle of claim 1, wherein the inorganic oxide core is selected from the group consisting of zirconia, titania, and silica.

3. The particle of claim 2, wherein the inorganic oxide core is zirconia.

4. The particle of claim 1, wherein the inorganic oxide core is porous.

5. The particle of claim 4, wherein the pore sizes range from 50-2000 angstroms.

6. The particle of claim 1, wherein the inorganic oxide core is non-porous.

7. The particle of claim 1, wherein the inorganic oxide core ranges from 1-100 microns in diameter.

8. The particle of claim 1, wherein the cross-linked polymer is hydrophobic.

9. The particle of claim 8, wherein the cross-linked polymer is polybutadiene (PBD).

10. The particle of claim 1, wherein the cross-linked polymer is hydrophilic.

11. The particle of claim 10, wherein the hydrophilic polymer is selected from the group consisting of polyvinylalcohol, poly(ethyleneglycol), polyvinylpyrollidone, polyethyleneimine, poly(butadiene maleic acid), polysiloxane, and poly-1-histidine, and dextran.

12. The particle of claim 1, wherein the chelator has at least one Lewis base site selected from the group consisting of OH, COOH, COOR, PO$_3$H, PO$_2$H, POH, SiH, SiCl.

13. The particle of claim 12, wherein the chelator has another reactive moiety selected from the group consisting of OH, NH, NH$_2$, COOH, and a double bond.

14. The particle of claim 1, wherein the chelator is EDTPA (N,N,N',N'-ethylenediaminetetra(methylenephosphonic acid)).

15. The particle of claim 1, wherein the chelator is PEI (poly(ethyleneimine)).

16. The particle of claim 1, further comprising a carbon cladding on the inorganic oxide core.

17. The particle of claim 1, wherein the particle is a spherule.

18. The particle of claim 1, wherein the particle is a monolith.

* * * * *